United States Patent [19]
Koizumi

[11] Patent Number: 5,699,209
[45] Date of Patent: Dec. 16, 1997

[54] DATA CARTRIDGE DRIVE

[75] Inventor: Osamu Koizumi, Miyagi, Japan

[73] Assignee: Sony Corporation, Tokyo, Japan

[21] Appl. No.: 651,751

[22] Filed: May 22, 1996

[30] Foreign Application Priority Data

May 26, 1995 [JP] Japan .................................. 7-151214

[51] Int. Cl.$^6$ .................................................. G11B 15/675
[52] U.S. Cl. .......................................................... 360/96.5
[58] Field of Search .................................. 360/96.5, 96.6; 242/347.1, 352.4

[56] References Cited

U.S. PATENT DOCUMENTS 5,204,792  4/1993  Bryer ............................... 360/96.5

Primary Examiner—Robert S. Tupper
Attorney, Agent, or Firm—William S. Frommer; Alvin Sinderbrand

[57] ABSTRACT

A data cartridge drive for use with a data cartridge having a front end formed with a magnetic head insert recess and a lid pivotably mounted to the front end for openably closing the magnetic head insert recess. The data cartridge drive includes a housing; a front panel mounted on a front end of the housing and having a cartridge insert opening from which the data cartridge is inserted into the housing; a lid opening member located in the housing at a position near the front panel on one lateral side of the cartridge insert opening, the lid opening member being slidable in an insert direction of the data cartridge and an eject direction opposite to the insert direction and being adapted to relatively come into abutment against a counter end portion of the lid of the data cartridge inserted from the cartridge insert opening into the housing to pivotally open the lid; and a biasing member for biasing the lid opening member in the eject direction of the data cartridge. Accordingly, the data cartridge drive can accept both the related art data cartridge and the large-capacity data cartridge, and can ensure safe opening of the lid with no interference with the magnetic head.

5 Claims, 27 Drawing Sheets

F I G. 12
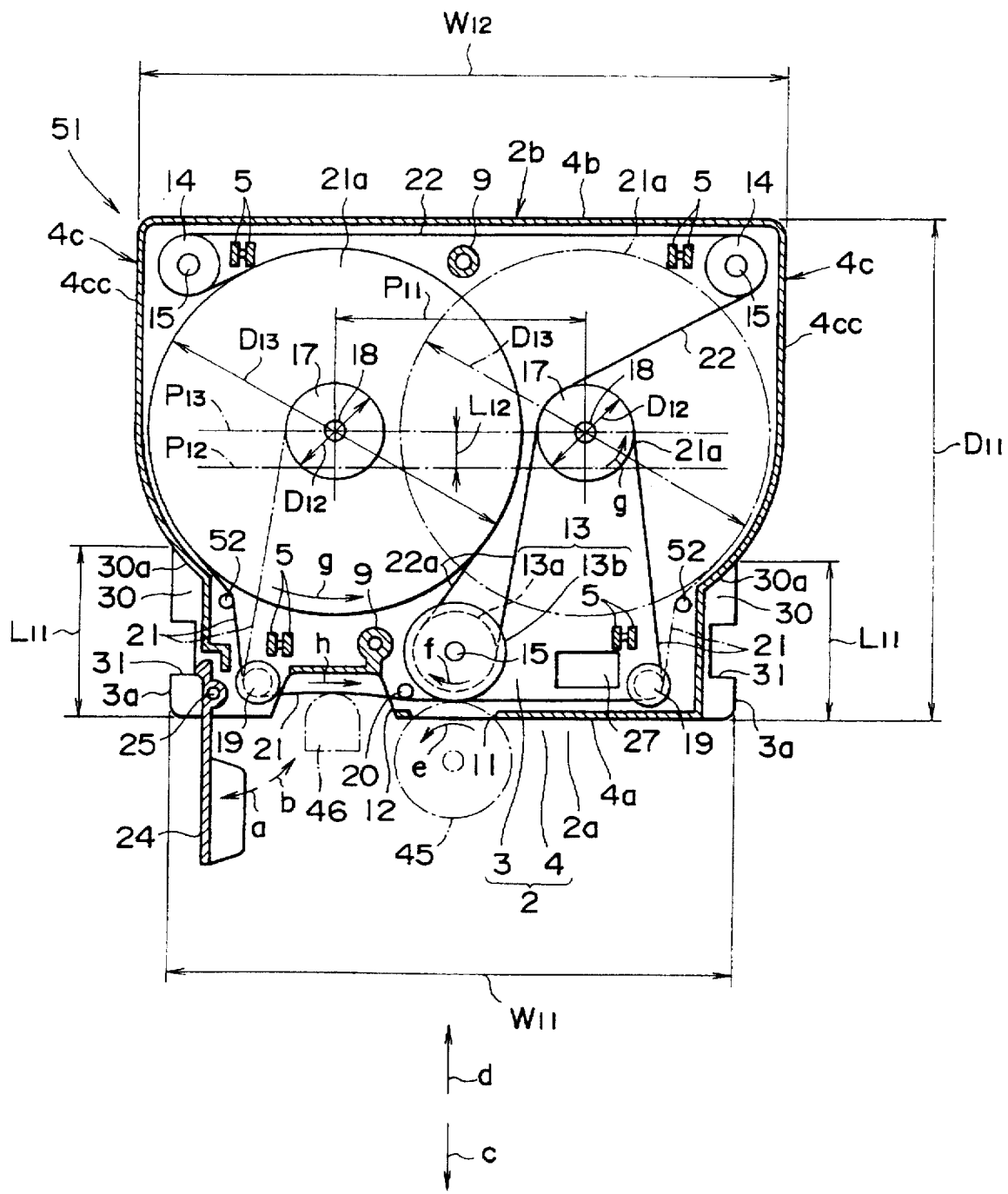

FIG. 15D
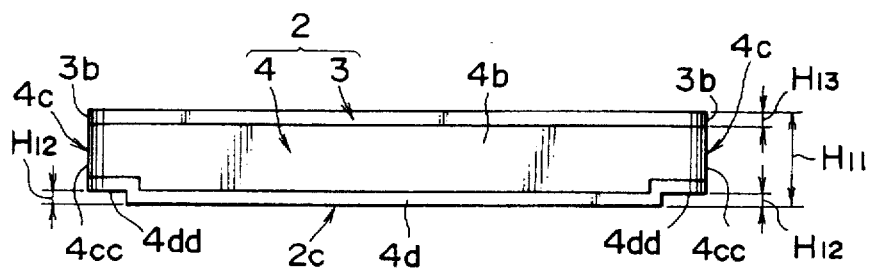
FIG. 15A           FIG. 15C
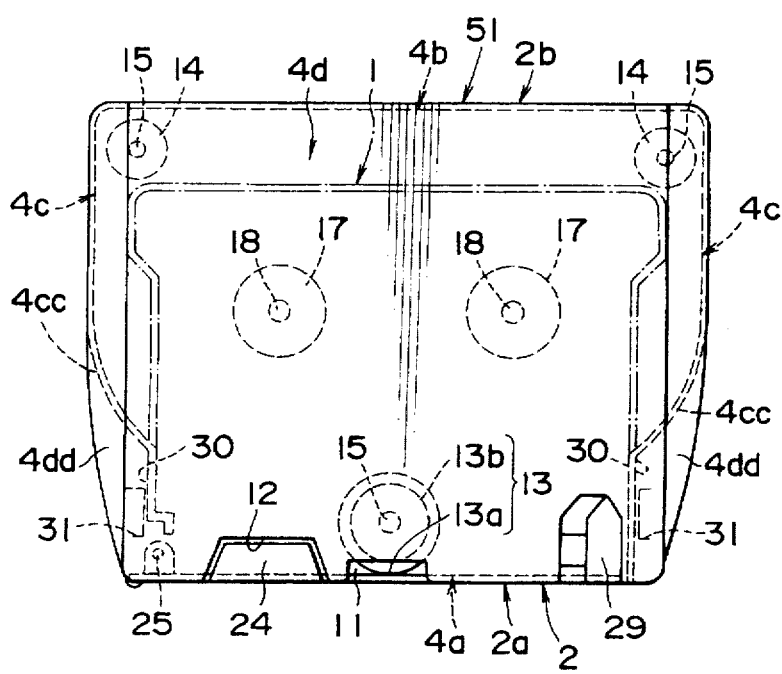    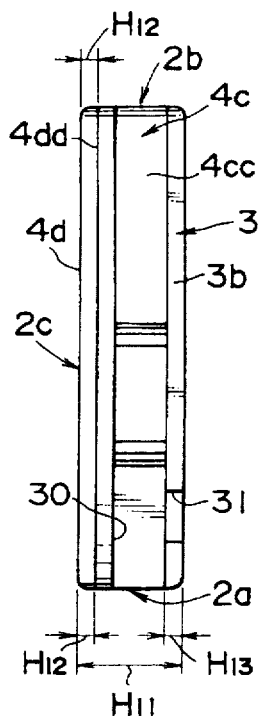
FIG. 15B
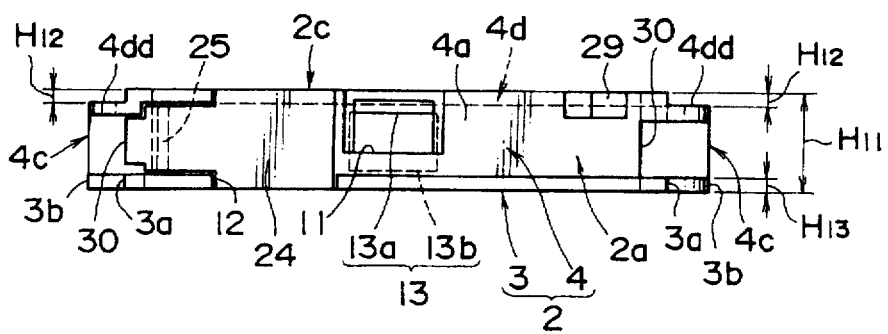

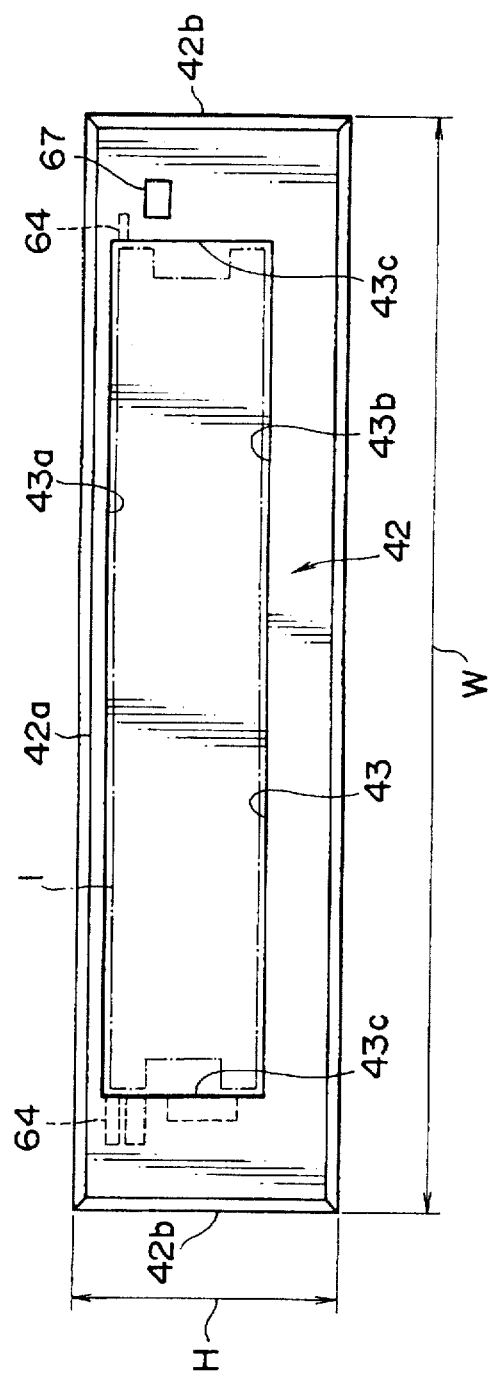
F I G. 23A
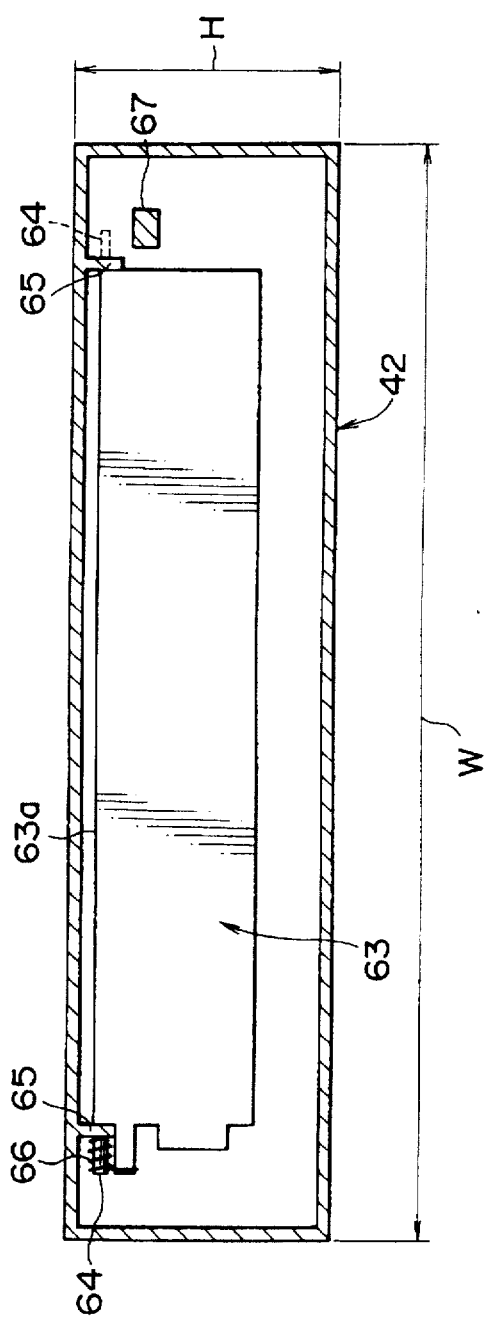
F I G. 23B

F I G. 28
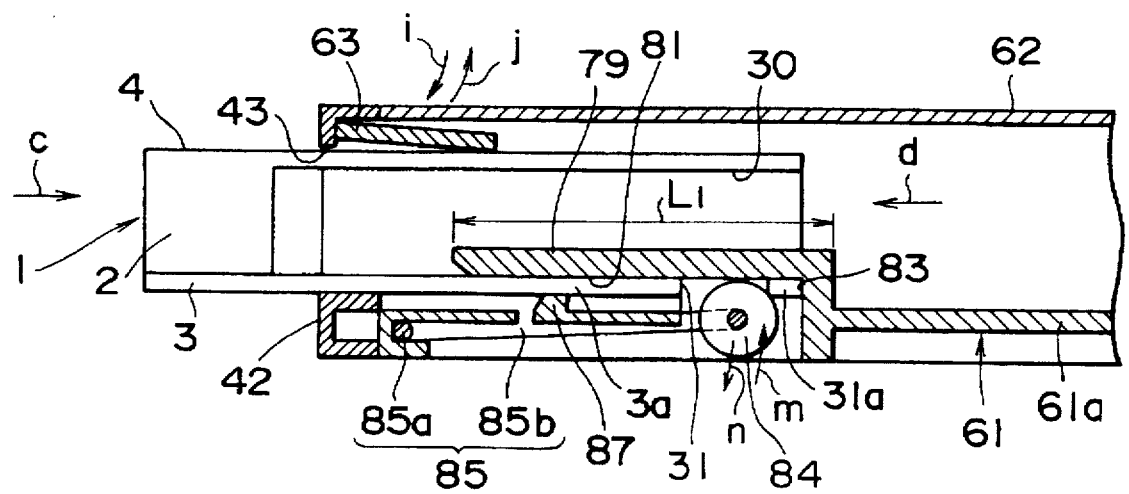

DATA CARTRIDGE DRIVE

BACKGROUND OF THE INVENTION

The present invention relates to a data cartridge drive applied to a magnetic recording/reproducing device optimal for use as an external storage device for backup of a computer (CPU), for example.

A related art data cartridge for use with this kind of data cartridge drive is known from Japanese Patent Publication No. Sho 52-14976, for example.

FIGS. 17 to 20 show a related art data cartridge 1. The data cartridge 1 has a substantially rectangular cartridge case 2 shaped like a flat box. The cartridge case 2 is composed of a base plate 3 formed from a flat plate of metal such as aluminum and a top cover 4 formed of synthetic resin or the like having light transmissivity.

The top cover 4 has a front wall 4a, a rear wall 4b, right and left side walls 4c, and a top wall 4d integrally formed together, and open on the lower side. Four pairs (totally eight) of downward lugs 5 are formed integrally with the lower surface of the top wall 4d in the vicinity of the four corners thereof, and four holes 6 for engaging the lugs 5 at their lower ends are formed in the base plate 3. Further, two screw insert holes 7 are formed through the base plate 3 in the vicinity of the front and rear ends near the laterally central position, and two downward bosses 9 are formed integrally with the lower surface of the top wall 4d at positions corresponding to the two screw insert holes 7, so as to threadedly engage two screws 8 through the screw insert holes 7. Accordingly, the top cover 4 is fixed to the base plate 3 by engaging the lower ends of the lugs 5 into the holes 6, and threadedly engaging the screws 8 through the screw insert holes 7 into the bosses 9.

A capstan roller insert opening 11 is formed through the front wall 4a at its laterally central portion, and a magnetic head insert recess 12 is also formed on the front wall 4a at a position leftside of the capstan roller insert opening 11.

A drive roller 13 is located in the cartridge case 2 at a position inside of the capstan roller insert opening 11, and a pair of right and left corner rollers 14 are located in the cartridge case 2 at two rear corner portions defined between the rear wall 4b and the right and left side walls 4c. The drive roller 13 and the corner rollers 14 are formed of synthetic resin or the like, and they are rotatably mounted on the outer circumferences of three posts 15 of metal or the like embedded at their lower ends in the base plate 3 by press fitting or the like.

The drive roller 13 consists of an upper large-diameter roller portion 13a and a lower small-diameter roller portion 13b integrally formed with each other. The large-diameter roller portion 13a is partially exposed to an upper region of the capstan roller insert opening 11 of the front wall 4a.

A pair of right and left tape reels 17 each having upper and lower flanges are located in the cartridge case 2 at a substantially longitudinally central position thereof. These tape reels 17 are formed of synthetic resin or the like, and they are rotatably mounted on the outer circumferences of two posts of metal or the like embedded at their lower ends in the base plate 3 by press fitting or the like.

A pair of right and left tape guides 19 each having upper and lower flanges are located in the cartridge case 2 near its front corner portions, and a flangeless tape guide 20 is also located in the cartridge case 2 at a position just leftside of the capstan roller insert opening 11. These tape guides 19 and 20 are formed of metal or the like, and they are embedded at their lower ends in the base plate 3 by press fitting or the like.

A magnetic tape 21 is wounded at its opposite end portions around the two tape reels 17. A portion of the magnetic tape 21 unwound from the tape reels 17 is guided by the three tape guides 19 and 20, and extends straight along the inner surface of the front wall 4a so as to pass across the inside of the capstan roller insert opening 11 and the magnetic head insert recess 12.

A drive belt 22 formed of an elastic material such as rubber is wound around the small-diameter roller portion 13b of the drive roller 13 and the two corner rollers 14 so as to form a T-shape as viewed in plan in a condition where strong tension is preliminarily applied. A pair of right and left tape drive portions 22a of the drive belt 22 are formed between the drive roller 13 and the right and left corner rollers 14. The right and left tape drive portions 22a are respectively kept in pressure contact with the outer circumferences of right and left tape wound portions 21a of the magnetic tape 21 respectively wound around the right and left tape reels 17.

The magnetic head insert recess 12 of the cartridge case 2 is so formed as to substantially trapezoidally cut out the front ends of the base plate 3 and the top wall 4d of the top cover 4. The magnetic head insert recess 12 is normally covered with a lid 24 whose part has a sectionally U-shaped cross section. The lid 24 is pivotably mounted on a vertical shaft 25 of metal or the like so as to be pivotable in the opposite directions of arrows a and b. The vertical shaft 25 is embedded at its lower end in the base plate 3 by press fitting or the like. The lid 24 is normally biased in the closing direction of the arrow b by a coiled torsion spring 26 as biasing means located so as to surround the outer circumference of the vertical shaft 25.

A mirror 27 for optical detection of a tape end is located in the cartridge case 2 at a position rightside of the drive roller 13. The mirror 27 is formed of synthetic resin or the like having light transmissivity, and is mounted on the base plate 3 by using a welded dowel or the like so as to close a light transmitting hole 28 formed through the base plate 3. Further, a write protect tab 29 is slidably mounted on the top wall 4d at its front right end portion.

A pair of right and left long grooves 30 are formed in parallel on the right and left side walls 4c of the top cover 4 of the cartridge case 2 so as to extend from front end 2a to a position near the rear end 2b of the cartridge case 2. The right and left ends 3a of the base plate 3 forming the lower walls of the grooves 30 are partially cut away near the front ends thereof to form a pair of right and left positioning recesses 31.

FIGS. 21A to 28 show a related art data cartridge drive 41 as a magnetic recording/reproducing device for use as an external storage device for backup of a computer (CPU). The data cartridge drive 41 includes a front panel 42 having a laterally elongated, rectangular cartridge insert opening 43, a capstan roller 45 of rubber of the like to be rotationally driven by a spindle 44a of a spindle motor 44, a magnetic head 46, an insert guide and positioning means (to be hereinafter described) for the base plate 3 of the data cartridge 1, and opening means for the lid 24 of the data cartridge 1.

In inserting the data cartridge 1 from its front end 2a into the cartridge insert opening 43 of the data cartridge drive 41 in the direction of an arrow c, the lid 24 of the data cartridge 1 is pivoted about the vertical shaft 25 against the torsion spring 26 in the opening direction of the arrow a, and the capstan roller 45 and the magnetic head 46 in the data cartridge drive 41 are relatively inserted into the capstan roller insert opening 11 and the magnetic head insert recess 12 of the data cartridge 1, respectively, in the direction of an arrow d.

As shown by phantom lines in FIG. 17, the capstan roller 45 is brought into pressure contact with the large-diameter roller portion 13a of the drive roller 13 by means of a spring to be hereinafter described in the direction of the arrow d, and the magnetic head 46 is brought into contact with the magnetic tape 21 passing across the magnetic head insert recess 12 between the left tape guide 19 and the intermediate tape guide 20.

When the capstan roller 45 is rotationally driven in the direction of an arrow e by the spindle motor 44, the drive roller 13 is rotationally driven in the direction of an arrow f by the capstan roller 45. Accordingly, the drive belt 22 is rotationally driven in the direction of an arrow g by the drive roller 13.

As a result, the right and left tape reels 17 are frictionally driven in the direction of the arrow g through the right and left tape wound portions 21a by the right and left tape drive portions 22a of the drive belt 22.

As a result, the magnetic tape 21 wound around the left tape reel 17 is taken up by the right tape reel 17 to travel in the direction of an arrow h between the right and left tape guides 19, thereby effecting read/write of computer (CPU) data on the magnetic tape 21 through the magnetic head 46.

The related art data cartridge drive 41 has a thin, rectangular solid-shaped housing consisting of a chassis 61 formed of synthetic resin or the like and having a substantially U-shaped cross section, and a top cover 62 formed of sheet metal or the like and having a substantially inverted U-shaped cross section. The top cover 62 is detachably engaged with the chassis 61 from the upper side. The front panel 42 having a laterally elongated, rectangular shape is formed of synthetic resin or the like, and it is detachably engaged with the front end of the above-mentioned housing.

A lid 63 for normally closing the laterally elongated, rectangular cartridge insert opening 43 formed through the front panel 42 is mounted inside of the front panel 42 so as to be pivotable in the opposite directions of arrows i and j shown in FIG. 28. The lid 63 is formed of synthetic resin or the like, and has a laterally elongated, substantially rectangular shape. A pair of right and left horizontal shafts 64 are formed integrally with the right and left ends of an upper edge 63a of the lid 63, and a pair of right and left vertical ribs 65 are formed integrally with the inner surface of an upper edge 42a of the front panel 42 at positions in the vicinity of the right and left ends thereof. The right and left horizontal shafts 64 of the lid 63 are rotatably inserted through the right and left ribs 65 of the front panel 42, thus pivotably mounting the lid 63 to the front panel 42 on the inside thereof. A coiled torsion spring 66 as biasing means is provided so as to surround the outer circumference of one of the two horizontal shafts 64, so as to normally bias the lid 63 in the closing direction of the arrow i.

A light emission indicator 67 is provided in the front panel 42 at a position between the right end 42b of the front panel 42 and the right end 43c of the cartridge insert opening 43 and near the upper edge 42a of the front panel 42. The light emission indicator 67 serves as a so-called operation lamp for indicating a read/write operation of the data cartridge drive 41 to the data cartridge 1 set therein.

A light guide member 68 formed of transparent acrylic resin or the like is located in the chassis 61 so as to extend along the right side wall 61b of the chassis 61 and near the upper edge of the right side wall 61b. The front end of the light guide member 68 functions as the light emission indicator 67. A circuit board 69 is horizontally mounted on the upper ends of the right and left side walls 61b and 61c of the chassis 61 at a rear portion thereof opposite to the front panel 42. A light emitting element 70 such as a light emitting diode is mounted on the lower surface of the circuit board 69 at a front right end portion thereof. The light emitting element 70 is in contact with the upper surface of the light guide member 68 at its rear end portion, so that flashing light from the light emitting element 70 is guided by the light guide member 68 to the light emission indicator 67, thereby effecting flashing indication by the light emission indicator 67.

The spindle motor 44 is mounted on the bottom wall 61a of the chassis 61 so as to be pivotable about a vertical shaft 72 in a given range in the opposite directions of arrows l and k shown in FIG. 25. The capstan roller 45 is mounted above the spindle motor 44 so as to be pivotable about the common shaft 72 through a support lever 73 in the opposite directions of the arrows l and k in concert with the pivotal motion of the spindle motor 44. A strong, coiled torsion spring 74 as biasing means is provided so as to surround the outer circumference of the vertical shaft 72, so as to normally bias the spindle motor 44 and the capstan roller 45 in the direction of the arrow l. The spindle motor 44 and the capstan roller 45 biased by the spring 44 are normally kept in a fixed position by a stopper (not shown).

The magnetic head 46 is supported to a vertical guide 75 standing on the bottom wall 61a of the chassis 61 so as to be vertically movable along the vertical shaft 75. A vertical feed screw mechanism 77 adapted to be rotationally driven in forward and reverse directions by a motor 76 is mounted on the bottom wall 61a, so as to vertically move the magnetic head 46 at a given pitch along the vertical guide 75.

A pair of right and left cartridge insert guides 79 and 80 symmetrical in shape are formed integrally with the inner surfaces of the right and left side walls 61b and 61c of the chassis 61 at a front portion thereof so as to extend horizontally in parallel to each other at a vertical position below the vertically central position of the chassis 61.

The horizontal lower surfaces of the right and left cartridge insert guides 79 and 80 function as vertical-direction reference surfaces 81 for the data cartridge 1 inserted into the drive 41, and the vertical inner side surface of the cartridge insert guide 79 functions as a horizontal-direction reference surface 82 for the data cartridge 1 inserted into the drive 41. Further, a pair of right and left cartridge insert stoppers 83 are vertically formed at the rear ends of the right and left cartridge insert guides 79 and 80 opposite to the front panel 42.

A pair of right and left cartridge positioning rollers 84 are located below the right and left cartridge insert guides 79 and 80 in the vicinity of the cartridge insert stoppers 83. The right and left cartridge positioning rollers 84 are supported by a wire spring 85 as biasing means so as to be vertically movable in the opposite directions of arrows m and n shown in FIG. 28. The cartridge positioning rollers 84 are normally biased in the upward direction of the arrow m by the wire spring 85.

The wire spring 85 has a substantially U-shaped configuration as viewed in plan as a whole. A central portion 85a of the wire spring 85 is fixed to the bottom wall 61a of the chassis 61 in the vicinity of the front panel 42. A pair of right and left arm portions 85b of the wire spring 85 extend rearward in parallel to each other, and the right and left cartridge positioning rollers 84 are rotatably mounted on the right and left arm portions 85b at their rear ends. While the right and left arm portions 85b are vertically pivotable about the central portion 85a in the opposite directions of the arrows m and n shown in FIG. 28, an initial stress in the upward direction of the arrow m is preliminarily given to the arm portions 85b, thereby normally biasing the cartridge positioning rollers 84 in the upward direction of the arrow m.

Further, a leaf spring 86 as biasing means for normally biasing the data cartridge 1 inserted into the drive 41 toward the horizontal-direction reference surface 82 in the direction of an arrow o shown in FIG. 26 is mounted on the inner surface of the left side wall 61c of the chassis 61.

Further, an elastic pressure arm 87 for elastically biasing upward the data cartridge 1 inserted in the drive 41 is formed integrally with the bottom wall 61a of the chassis 61 in the vicinity of the front panel 42.

The operation of setting the data cartridge 1 into the data cartridge drive 41 will now be described with reference to FIGS. 26 to 28. When the front end 2a of the data cartridge 1 is inserted into the cartridge insert opening 43 of the front panel 42 in the direction of the arrow c, the lid 63 is urged by the front end 2a of the data cartridge 1 against the torsion spring 66 to open in the direction of the arrow j.

When the data cartridge 1 is further inserted, the cartridge insert guides 79 and 80 of the drive 41 are relatively inserted into the side grooves 30 of the data cartridge 1.

In the initial stage of insertion of the data cartridge 1, a counter end portion 24a of the lid 24 of the data cartridge 1 comes into abutment against the front end 79a of the cartridge insert guide 79, and then comes to ride on the horizontal-direction reference surface 82 of the cartridge insert guide 79, thereby instantaneously opening the lid 24 about the pivot shaft 25 against the torsion spring 26 in the direction of the arrow a to expose the magnetic head insert recess 12.

Further, in this initial stage of insertion of the data cartridge 1, the base plate 3 of the data cartridge 1 comes to ride on the elastic pressure arm 87 of the bottom wall 61a of the chassis 61, and the lateral end portions 3a of the base plate 3 are elastically pressed upward against the vertical-direction reference surfaces 81 of the cartridge insert guides 79 and 80 by the elastic pressure arm 87.

At the time of completion of insertion of the data cartridge 1, the front ends of the lateral end portions 3a of the base plate 3 come into abutment against the cartridge insert stoppers 83, thereby stopping the data cartridge 1. Further, the lateral end portions 3a of the base plate 3 come to ride on the cartridge positioning rollers 84.

At this time, the cartridge positioning rollers 84 are once depressed by the lateral end portions 3a of the base plate 3 in the downward direction of the arrow n against the wire spring 85, and are next lifted by the reaction force of the wire spring 85 in the upward direction of the arrow m to come into engagement with the positioning recesses 31 formed in the lateral end portions 3a of the base plate 3. In this condition, the rollers 84 are strongly pressed against the front edges 31a of the positioning recesses 31 by the biasing force of the wire spring 85.

Accordingly, the front ends of the lateral end portions 3a of the base plate 3 are pressed against the cartridge insert stoppers 83 in the forward direction of the arrow c, and the upper surfaces of the lateral end portions 3a are pressed against the vertical-direction reference surfaces 81 of the cartridge insert guides 79 and 80 in the upward direction of the arrow m, thus positioning the data cartridge 1.

Just prior to completion of insertion of the data cartridge 1, the leaf spring 86 is relatively inserted into one of the grooves 30 of the data cartridge 1 in the direction of the arrow d. Accordingly, the data cartridge 1 is urged by the leaf spring 86 in the direction of the arrow o, so that the bottom surface of the other groove 30 of the data cartridge 1 comes into pressure contact with the horizontal-direction reference surface 82 of the cartridge insert guide 79.

When the insertion of the data cartridge 1 into the drive 41 is completed, the magnetic head 46 is relatively inserted into the magnetic head insert recess 12 of the data cartridge 1 in the direction of the arrow d to come into contact with the magnetic tape 21. At the same time, the drive roller 13 of the data cartridge 1 is pressed against the capstan roller 45 in the direction of the arrow c.

At this time, the capstan roller 45 is pressed against the spindle 44a of the spindle motor 44 in the direction of the arrow c, and the spindle motor 44 is accordingly pivoted about the vertical shaft 72 in concert with the capstan roller 45 in the direction of the arrow k against the strong torsion spring 74. As a result, the capstan roller 45 is strongly pushed back from the spindle 44a by the reaction force of the strong torsion spring 74 in the direction of the arrow l to come into strong pressure contact with the drive roller 13 in the direction of the arrow d.

In this condition, the drive roller 13 is rotationally driven through the capstan roller 45 by the spindle motor 44, and the magnetic tape 21 is traveled by the drive belt 22 wound around the drive roller 13, thus effecting read/write on the magnetic tape 21 by the magnetic head 46.

The rear/write operation to the data cartridge 1 is indicated by flashing light from the light emission indicator 67.

Further, in the rear/write operation to the data cartridge 1, the magnetic head 46 is vertically moved along the vertical guide 75 at a given pitch by the vertical feed screw mechanism 77 driven by the motor 76, thereby sequentially performing channel switch of the magnetic head 46.

The size of the data cartridge drive 41 ready for the 3.5-inch form factor in computer industry is ordinarily called a 1-inch height and standardized to 1 inch (25.4 mm) in thickness (height) H and 4 inches (101.6 mm) in width W.

The related art data cartridge 1 adapted to this kind of 1-inch height data cartridge drive 41 has a substantially rectangular shape, and the size of the data cartridge 1 is set to 81 mm in width $W_1$ at both the front and rear ends 2a and 2b, 61 mm in depth $D_1$, and 14.7 mm in thickness (height) $H_1$. Further, the tape width $W_3$ of the magnetic tape 21 is set to 8 mm, and the length $L_1$ of each groove 30 is set to 48 mm.

Further, the reel diameter (i.e., the diameter of a hub for winding the magnetic tape 21) $D_2$ of each tape reel 17 is set to 14 mm; the reel pitch $P_1$ between the two tape reels 17 is set to 40 mm; and the maximum diameter $D_3$ of each tape wound portion 21a is set to 39 mm. With this configuration, a maximum length of 400 feet (122,000 mm) of the magnetic tape 21 with a maximum thickness of 7.9 µm is ordinarily realized.

However, a further increase in length of a magnetic tape is desired, so as to increase a storage capacity of data.

To this end, the present inventor has developed a large-capacity data cartridge 51 as shown in FIGS. 12 to 16B, which is a data cartridge applicable to the related art data cartridge drive ready for the 3.5-inch form factor, and can increase the maximum length of a magnetic tape.

As shown in FIGS. 12 to 15, the size of the large-capacity data cartridge 51 is set so that the width $W_{11}$ of the front end 2a of a cartridge case 2 is set to not greater than 81 mm, the width $W_{12}$ of the rear end 2b of the cartridge case 2 is set to not less than 95 mm and not grater than 101.6 mm, the maximum thickness (maximum height) $H_{11}$ of the cartridge case 2 is set to not greater than 14.7 mm, and the depth of the cartridge case 2 is set to not less than 72 mm.

The reel diameter $D_{12}$ of each tape reel 17 is set to 14 mm, for example, and the reel pitch $P_{11}$ between the tape reels 17 is set to 40 mm, for example. These values of the reel diameter $D_{12}$ and the reel pitch $P_{11}$ are merely illustrative and not limitative.

The maximum diameter $D_{13}$ of each tape wound portion 21a of a magnetic tape 21 wound around each tape reel 17 is set to not greater than 55 mm. With the above configuration, a maximum length of not less than 775 feet (236,375 mm) of the magnetic tape 21 with a maximum thickness of 7.9 μm can be realized.

Actually, a maximum length of 800 feet (244,000 mm) of the magnetic tape 21 has been realized by setting $W_{11}$=81 mm, $W_{12}$=95 mm, $D_{11}$=72 μmm, and $D_{13}$=55 mm and using the magnetic tape 21 with a thickness of 7.9 mm.

To satisfy the above conditions, the cartridge case 2 of the large-capacity data cartridge 51 is configured so that the length $L_{11}$ of each of right and left grooves 30 formed on right and left side walls 4c of a top cover 4 is set to a reduced value of about 20.47 mm, and these grooves 30 are formed only near the front end 2a of the cartridge case 2.

Further, the right and left ends 3a of the base plate 3 are formed with right and left, laterally expanded portions 3b laterally symmetrical with each other, and the right and left side walls 4c of the top cover 4 are similarly formed with right and left, laterally expanded portions 4cc laterally symmetrical with each other. These expanded portions 3b and 4cc extend longitudinally from near the rear ends 30a of the grooves 30 to the rear end 2b of the cartridge case 2.

Further, the top wall 4d of the top cover 4 is formed with right and left wing-shaped end portions 4dd projecting laterally beyond the width $W_{11}$ in lateral symmetry with each other so as to longitudinally extend from the front wall 4a to the rear wall 4b of the top cover 4. The right and left end portions 4dd of the top wall 4d are lower in level by $H_{12}$ set to 1.65 mm, for example, than the upper surface 2c of the cartridge case 2 (i.e., the upper surface of the top wall 4d). The thickness $H_{13}$ of the base plate 3 is set to 2.03±0.05 mm.

Further, a reel center P13 is set at a longitudinal position slightly offset from a longitudinally central position $P_{12}$ of the cartridge case 2 (the central position of the cartridge case 2 in the vertical direction as viewed in FIG. 12) by a distance $L_{12}$ in the rearward direction (the upward direction as viewed in FIG. 12). The centers of the right and left tape reels 17 are located on the reel center $P_{13}$.

A pair of tape guides 52 are additionally provided in the cartridge case 2 of the large-capacity data cartridge 51, so as to accommodate a change in traveling path of the magnetic tape due to an increase in maximum diameter $D_{13}$ of each tape wound portion 21a. The tape guides 52 are formed of metal or the like, and they are embedded at their lower ends in the base plate 3 by press fitting or the like.

As shown in FIGS. 16A and 16B, the large-capacity data cartridge 51 can be applied without a hitch to the data cartridge drive 41 ready for the 3.5-inch form factor with the standard that the thickness (height) H is set to 1 inch (25.4 mm) and the width W is set to 4 inches (101.6 mm).

However, to make the shape of the cartridge insert opening 43 of the front panel 42 conform with the vertical sectional shape of the large-capacity data cartridge 51, it is preferable to modify the shape of the cartridge insert opening 43 in the following manner. That is, the width $W_{111}$ Of the upper edge 43a of the cartridge insert opening 43 is set to not less than 81 mm; the width $W_{112}$ of the lower edge 43b of the cartridge insert opening 43 is set to not less than 95 mm; the height $H_{111}$ between the upper edge 43a and the lower edge 43b is set to not less than 14.7 mm, and a pair of right and left stepped portions 43d are formed at right and left upper corner portions between the right and left ends of the upper edge 43a and the right and left side edges 43c of the cartridge insert opening 43, wherein the height $H_{112}$ of each stepped portion 43d is set to not greater than 1.65 mm.

However, the length $L_{11}$ of each side groove 30 of the large-capacity data cartridge 51 must be set to a reduced value of about 20.47 mm as mentioned above in comparison with the fact that the length $L_1$ of each side groove 30 of the related art data cartridge 1. Accordingly, to make the large-capacity data cartridge 51 applicable to the related art data cartridge drive 41, the length of each of the cartridge insert guides 79 and 80 must be reduced to about 20.47 mm so as to conform with the length $L_{11}$.

In the initial stage of insertion of the related art data cartridge 1 into the cartridge insert opening 43 of the related art data cartridge drive 41 in the direction of the arrow c, the counter end portion 24a of the lid 24 of the data cartridge 1 first comes into abutment against the front end portion 79a of the cartridge insert guide 79 to thereby instantaneously open the lid 24 in the direction of the arrow a. Then, the data cartridge 1 is further inserted into the depth of the drive 41, so that the lid 24 in its open condition is forwarded in the direction of the arrow c with no interference with the magnetic head 46, and the magnetic head 46 is relatively inserted into the magnetic head insert recess 12 of the data cartridge 1 in the direction of the arrow d until coming into contact with the magnetic tape 21.

Accordingly, if the length of each of the cartridge insert guides 79 and 80 is reduced to about 20.47 mm conforming with the length $L_{11}$ of each side groove 30 of the large-capacity data cartridge 51, so as to make the data cartridge 51 applicable to the related art data cartridge drive 41, the lid 24 may interfere with the magnetic head 46 when the large-capacity data cartridge 51 is inserted into the cartridge insert opening 43 in the direction of the arrow c.

That is, near the end of insertion of the large-capacity data cartridge 51 into the cartridge insert opening 43 in the direction of the arrow c, the counter end portion 24a of the lid 24 comes into abutment against the front end portion 79a of the cartridge insert guide 79 to pivotally open the lid 24 in the direction a. Accordingly, during the pivotal opening motion of the lid 24, the lid 24 comes into collision with the magnetic head 46, causing a new problem that the lid 24 and the magnetic head 46 may be mutually broken by this collision.

SUMMARY OF THE INVENTION

It is accordingly an object of the present invention to provide a data cartridge drive which can accept both the related art data cartridge and the large-capacity data cartridge, and can ensure safe opening of the lid with no interference with the magnetic head.

According to the present invention, there is provided a data cartridge drive for use with a data cartridge having a front end formed with a magnetic head insert recess and a lid pivotably mounted to the front end for openably closing the magnetic head insert recess, the data cartridge drive comprising a housing; a front panel mounted on a front end of the housing and having a cartridge insert opening from which the data cartridge is inserted into the housing; a lid opening member located in the housing at a position near the front panel on one lateral side of the cartridge insert opening, the lid opening member being slidable in an insert direction of the data cartridge and an eject direction opposite to the insert direction and being adapted to relatively come into abutment against a counter end portion of the lid of the data cartridge inserted from the cartridge insert opening into the housing to pivotally open the lid; and a first biasing means for biasing the lid opening member in the eject direction of the data cartridge.

With this configuration, in the initial stage of insertion of the data cartridge into the cartridge insert opening, the counter end portion of the lid first comes into abutment against the lid opening member to thereby instantaneously open the lid. When the data cartridge is further inserted, the lid opening member is pushed by the data cartridge and slid in the insert direction against the biasing means. At the end of insertion of the data cartridge, the magnetic head is relatively inserted into the magnetic head insert recess of the data cartridge until coming into contact with the magnetic tape. Accordingly, the lid of the data cartridge can be safely opened with no interference with the magnetic head, irrespective of the length of each cartridge insert guide. As a result, both the related art data cartridge and the large-capacity data cartridge can be applied commonly to the data cartridge drive.

Preferably, the data cartridge has second biasing means for biasing the lid in a closing direction of the lid, and a biasing force of the first biasing means for biasing the lid opening member in the eject direction of the data cartridge is set larger than a biasing force of the second biasing means for biasing the lid in the closing direction. Accordingly, the opening operation of the lid of the data cartridge upon insertion of the data cartridge into the cartridge insert opening can be reliably performed.

Preferably, the lid opening member is formed of lubricious synthetic resin. Accordingly, the lid opening member can be smoothly slid with less load during insertion of the data cartridge, so that the data cartridge can be smoothly inserted into the cartridge insert opening. In addition, lubricating oil such as grease need not be applied to the lid opening member, thus improving the productivity.

Other objects and features of the invention will be more fully understood from the following detailed description and appended claims when taken with the accompanying drawings.

BRIEF DESCRIPTION OF THE DRAWINGS

FIG. 12 is a partially sectional, top plan view of the large-capacity data cartridge;

FIGS. 15A, 15B, 15C, and 15D are a top plan view, a front elevation, a right side view, and a rear elevation, respectively, of the large-capacity data cartridge;

FIGS. 23A and 23B are a front elevation and a partially sectional, front elevation, respectively, illustrating a lid mounting structure and a light emission indicator in the front panel of the related art data cartridge drive;

FIG. 28 is a partially sectional, side elevation of FIG. 27.

DETAILED DESCRIPTION OF THE PREFERRED EMBODIMENTS

Figure 1A:
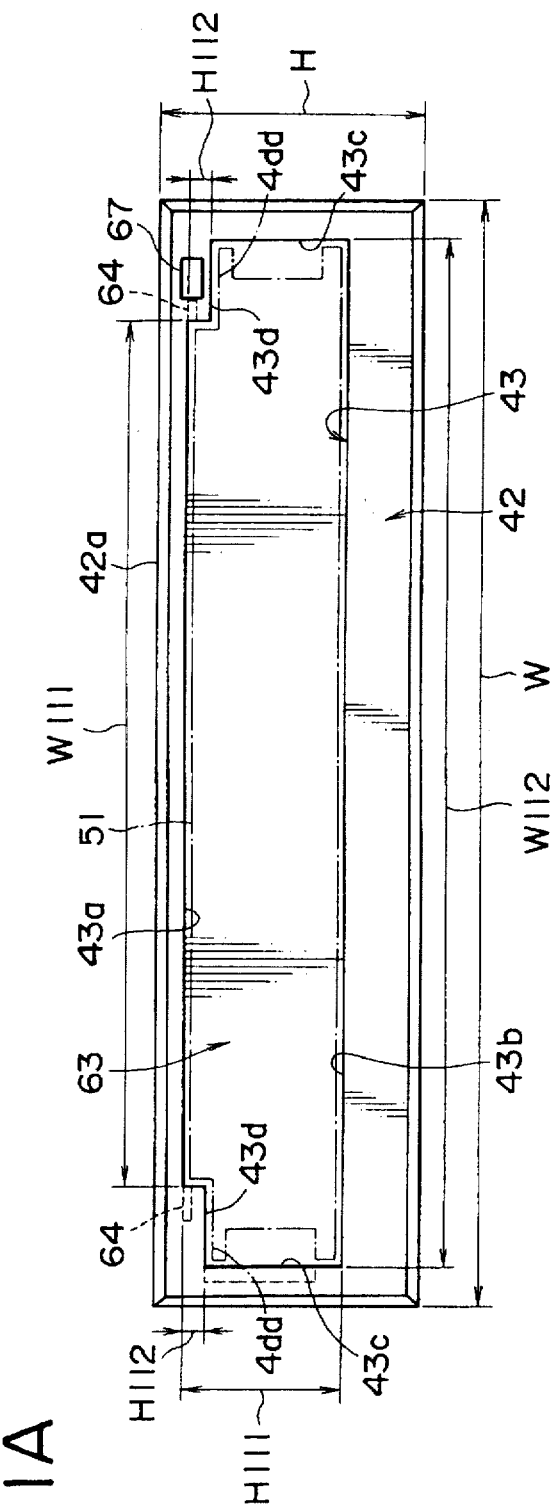
FIGS. 1A and 1B are a front elevation and a partially sectional, front elevation, respectively, illustrating a lid mounting structure and a light emission indicator in a front panel of a data cartridge drive according to a preferred embodiment of the present invention.
Figure 1B:
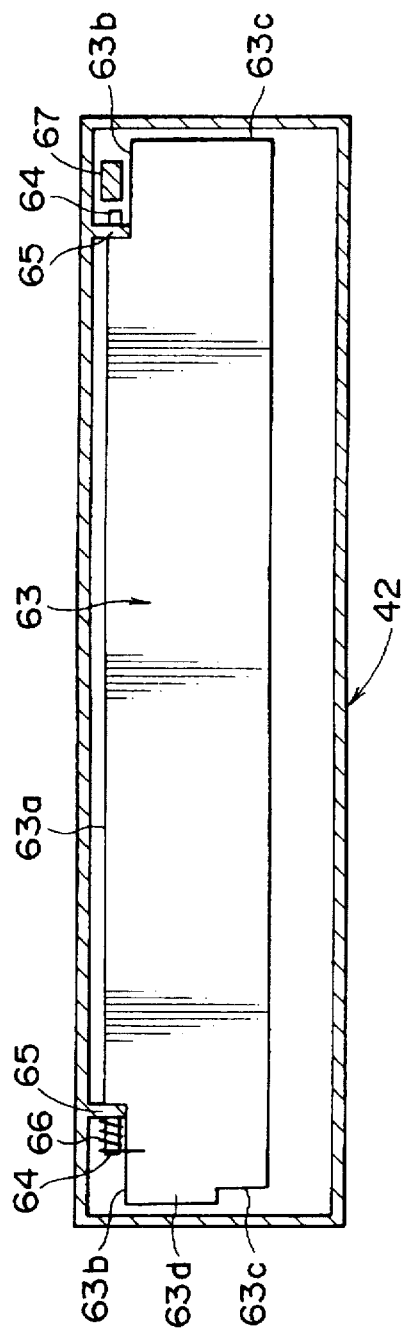

There will now be described a preferred embodiment of the data cartridge drive ready for the 3.5-inch form factor according to the present invention that can commonly use both the related art data cartridge 1 and the large-capacity data cartridge 51, with reference to FIGS. 1A to 11. In the following description of the preferred embodiment, the same structural parts as those shown in FIGS. 12 to 28 will be denoted by the same reference numerals, and the description thereof will be omitted to avoid repetition.

[Description of a Lid Mounting Structure and a Light Emission Indicator in a Front Panel]

A mounting structure of a lid 63 to a front panel 42 and a light emission indicator 67 in the front panel 42 will now be described with reference to FIGS. 1A to 4.

As mentioned previously, the size of a data cartridge drive 41 in this preferred embodiment is called a 1-inch height and standardized so that the thickness (height) H is set to 1 inch (25.4 mm) and the width W is set to 4 inches (101.6 mm).

The shape of a laterally elongated, rectangular cartridge insert opening 43 of the front panel 42 is set so as to conform with the vertical sectional shape of the large-capacity data cartridge 51, and the size of the cartridge insert opening 43 is set so that the width $W_{111}$ of the upper edge 43a of the cartridge insert opening 43 is set to not less than 81 mm, the width $W_{112}$ of the lower edge 43b of the cartridge insert opening 43 is set to not less than 95 mm, and the height $H_{111}$ between the upper edge 43a and the lower edge 43b is set to not less than 14.7 mm. Further, a pair of right and left stepped portions 43d each having a height of not greater than 1.65 mm are formed at the right and left upper corner portions between the upper edge 43a and the right and left side edges 43c of the cartridge insert opening 43.

Accordingly, the height $H_{112}$ of each stepped portion 43d at the right and left corner portions formed so as to conform with the height $H_{12}$ (=1.65 mm) of each side portion 4dd of the top wall 4d of the large-capacity data cartridge 51.

Further, a pair of right and left stepped portions 63b conforming with the right and left stepped portions 43d of the cartridge insert opening 43 are formed at the right and left upper corner portions between the upper edge 63a and the right and left side edges 63c of the lid 63.

A pair of right and left horizontal pivot shafts 64 are formed integrally with the right and left stepped portions 63b of the lid 63, and a pair of right and left vertical ribs 65 are formed integrally with the inner surface of the upper wall of the front panel 42 at positions corresponding to the right and left stepped portions 43d. The horizontal pivot shafts 64 of the lid 63 are mounted to the vertical ribs 65 of the front panel 42 so as to be rotatable in the opposite directions of arrows i and j.

A coiled torsion spring 66 as biasing means is provided so as to surround the outer circumference of one of the two pivot shafts 64, so as to normally bias the lid 63 in the closing direction of the arrow i. One of the right and left side edges 63c of the lid 63 is partially projected laterally to form a stopper portion 63d. The stopper portion 63d of the lid 63 is normally kept in abutment against the inner surface 42d of the front panel 42 by the biasing force of the torsion spring 66. Such a normally closed condition of the lid 63 is shown in FIG. 2.

The light emission indicator 67 is located in a portion of the front panel 42 defined by one of the two stepped portions 43d (the right one as viewed in FIGS. 1A and 1B) of the cartridge insert opening 43.

Figure 2:
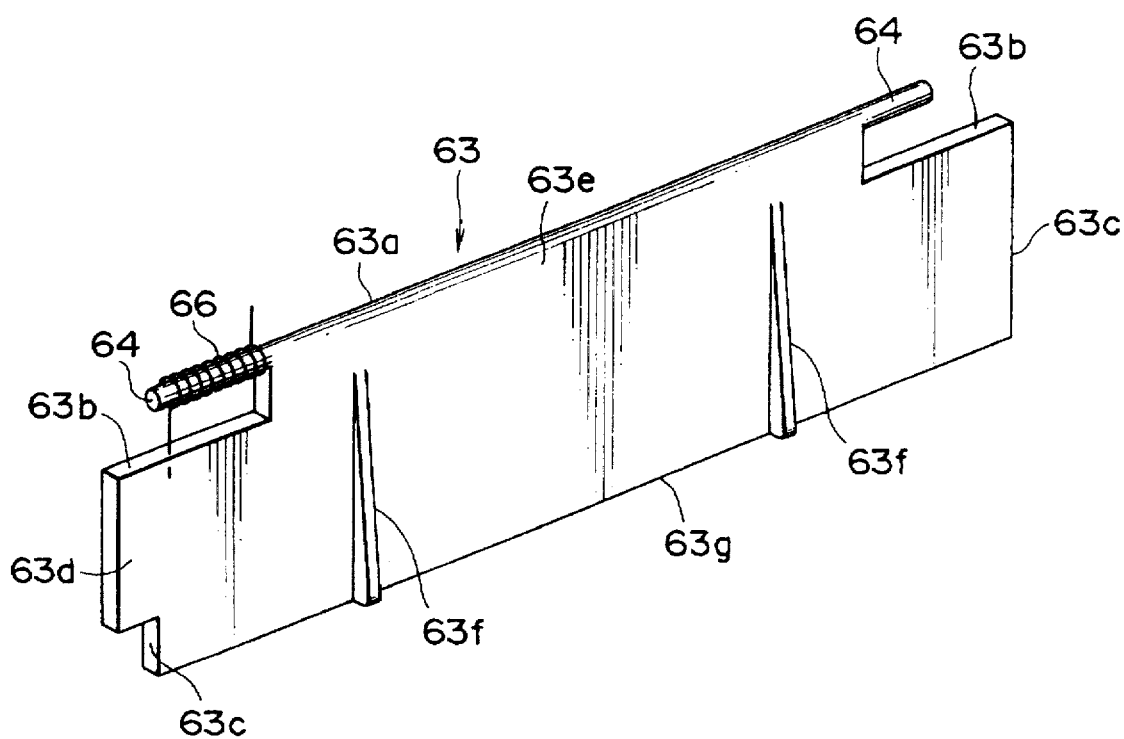
FIG. 2 is a perspective view of a lid mounted to the front panel.

As shown in FIG. 2, a pair of right and left camlike vertical ribs 63f are formed integrally with the front surface 63e of the lid 63, so as to prevent flawing of the front surface 63e due to abutment of the data cartridge 1 or the large-capacity data cartridge 51 and facilitate opening of the lid 63 upon pushing the data cartridge 1 or 51 against the lid 63.

With the above configuration, the data cartridge drive 41 in this preferred embodiment can be applied commonly to both the data cartridge 1 and the large-capacity data cartridge 51. In spite of this common application, the height H of the front panel 42 can be set to not greater than 1 inch and the width W of the front panel 42 can be set to not greater than 4 inches.

Further, the right and left stepped portions 43d are formed at the right and left upper corner portions of the cartridge insert opening 43 so as to have the height $H_{112}$ conforming with the height $H_{12}$ of the right and left side stepped portions 4dd of the top wall 4d of the large-capacity data cartridge 51. Accordingly, centering of the large-capacity data cartridge 51 upon insertion thereof into the cartridge insert opening 43 can be smoothly effected, and possibly erroneous insertion such that the large-capacity data cartridge 51 turned upside down may be inserted can be prevented.

[Description of an Elastic Pressure Fixing Mechanism for the Data Cartridge]

An elastic pressure fixing mechanism for the data cartridge 1 or the large-capacity data cartridge 51 will now be described with reference to FIGS. 3 and 4. The elastic pressure fixing mechanism is provided inside of the front panel 42.

The elastic pressure fixing mechanism includes a leaf spring 54 as elastic pressing means fixed to the lower surface 62a of the top cover 62 by any fixing means such as riveting 53. The leaf spring 54 is so designed as to cooperate with the lid 63 to elastically press down the data cartridge 1 or the large-capacity data cartridge 51 inserted into the cartridge insert opening 43, at an inside position P100 in the vicinity of the front panel 42 (this position P100 being set at a distance $L_{100}$ of not greater than tens of millimeters from the inner surface 42b of the front panel 42).

Further, a height reference projection 55 is formed integrally with the bottom wall 61a of the chassis 61 in parallel to the front panel 42 at an inside position P101 in the vicinity of the cartridge insert opening 43 (this position P101 being set at a distance $L_{101}$ of not greater than several millimeters from the cartridge insert opening 43).

The operation of the elastic pressure fixing mechanism will now be described. When the data cartridge 1 or the large-capacity data cartridge 51 is horizontally inserted into the cartridge insert opening 43 in the direction of the arrow c, the lid 63 is pushed by the front end of the cartridge 1 or 51 to pivot in the direction of the arrow j against the torsion spring 66 as shown by a phantom line in FIG. 3.

Figure 3:
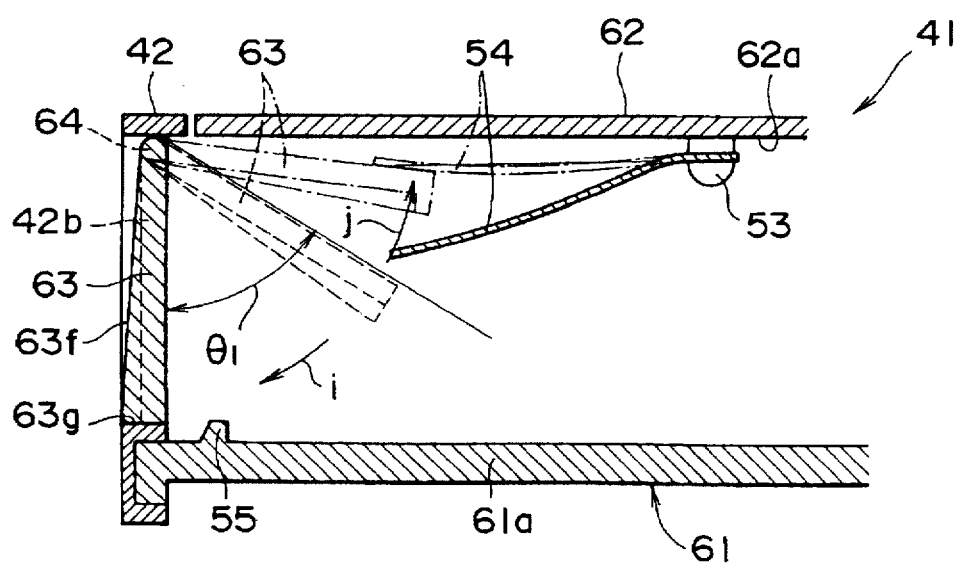
FIG. 3 is a partially sectional, side elevation illustrating an elastic pressure fixing mechanism for a data cartridge, located inside of the front panel.

Within a given opening angle $\theta_1$, of not less than 45° between a closed position of the lid 63 shown by a solid line in FIG. 3 and an open position of the lid 63 shown by a broken line in FIG. 3, the lid 63 does not come into contact with the leaf spring 54.

When the opening angle of the lid 63 exceeds the given angle $\theta_1$, the lid 63 comes into contact with the leaf spring 54 in the direction of the arrow j. As a result, a strong elastic biasing force as a resultant force of reaction forces of the leaf spring 54 and the torsion spring 66 is applied to the lid 63 in the direction of the arrow i.

Figure 4:
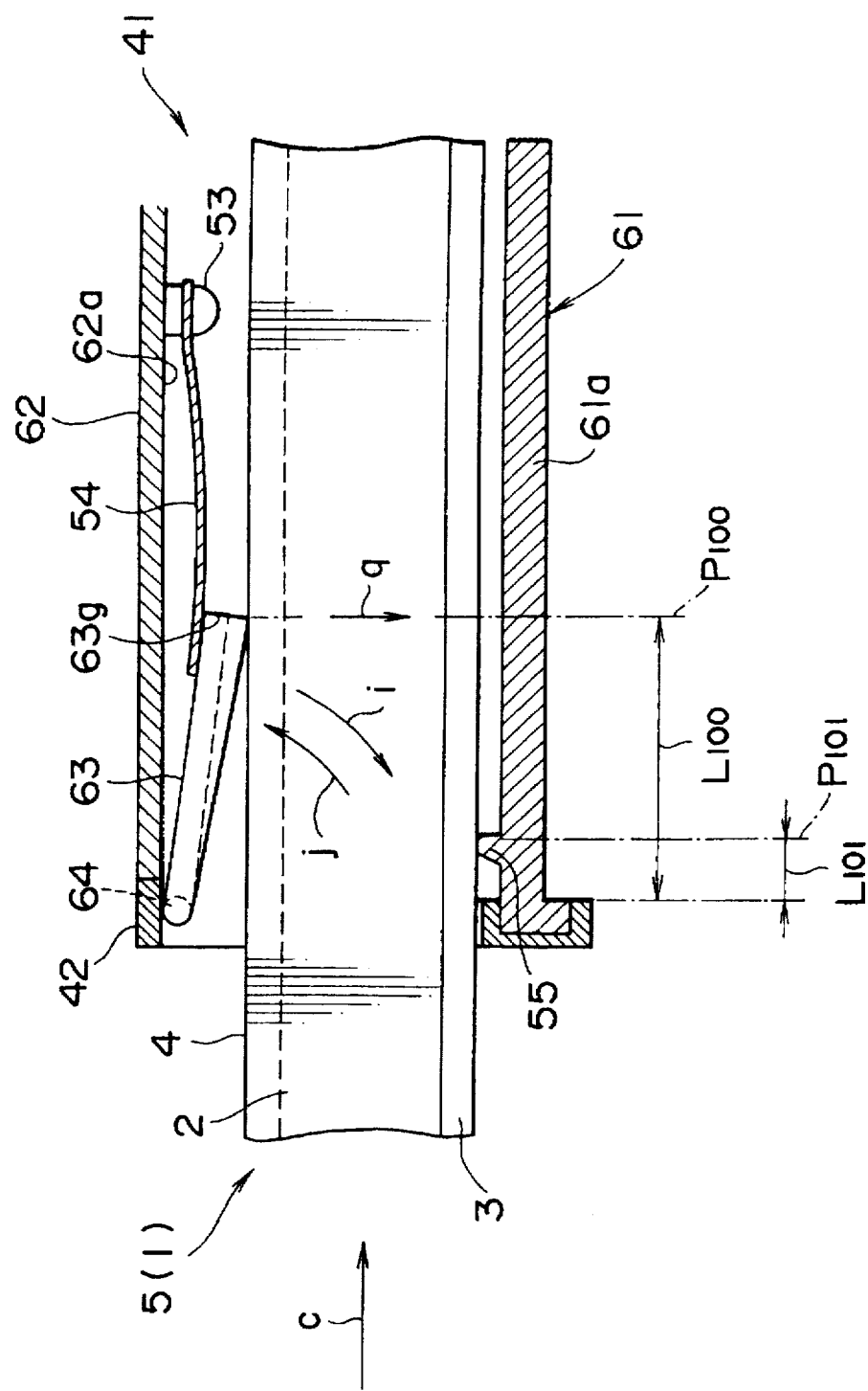
FIG. 4 is a partially sectional, side elevation illustrating a fixed condition of the data cartridge by the elastic pressure fixing mechanism shown in FIG. 3.

Accordingly, when the insertion of the data cartridge 1 or the large-capacity data cartridge 51 into the cartridge insert opening 43 is completed as shown in FIG. 4, the lid 63 is biased in the direction of the arrow i by the strong elastic biasing force as the resultant force of reaction forces of the leaf spring 54 and the torsion spring 66, so that the lower edge 63g of the lid 63 elastically strongly presses down the top cover 4 of the data cartridge 1 or the large-capacity data cartridge 51 at the above-mentioned inside position P100 in the direction of an arrow q.

As a result, the base plate 3 of the data cartridge 1 or the large-capacity data cartridge 51 is elastically strongly pressed on the height reference projection 55 of the bottom wall 61a of the chassis 61 at the above-mentioned inside position P101 in the direction of the arrow q, thus fixing the data cartridge 1 or 51 in the drive 41 at the given position.

As described above, the data cartridge 1 or the large-capacity data cartridge 51 fully inserted from the cartridge insert opening 43 into the data cartridge drive 41 is stably fixed in the drive 41 by elastically strongly pressing the base plate 3 of the cartridge 1 or 51 on the height reference projection 55 formed at the inside position P101. In particular, the large-capacity data cartridge 51 whose amount of projection from the cartridge insert opening 43 in the fully inserted condition is larger than that of the data cartridge 1 can be always stably fixed even against disturbance such as vibration and shock, thus obtaining high reliability.

As described above, the data cartridge 1 or the large-capacity data cartridge 51 is elastically pressed down by the elastic forces of the leaf spring 54 and the torsion spring 66 to put the base plate 3 into strong pressure contact with the height reference projection 55. Since the base plate 3 is formed of metal or the like, and variations in thickness thereof is small, the height of the data cartridge 1 or the large-capacity data cartridge 51 can be set with a high precision on the basis of the base plate 3.

The elastic pressure fixing mechanism is designed so as to cooperate with the lid 63 and the torsion spring 66. Accordingly, with a simple structure and a low cost of the elastic pressure fixing mechanism, a strong elastic force as the resultant force of reaction forces of the leaf spring 54 and the torsion spring 66 can be given to the data cartridge 1 or the large-capacity data cartridge 51, thereby strongly pressing the cartridge 1 or 51 on the height reference projection 55.

Within the given opening angle $\theta_1$ of the lid 63, no resultant force of reaction forces of the leaf spring 54 and the torsion spring 66 is applied to the data cartridge 1 or 51, but only the elastic force of the torsion spring 66 is applied to the data cartridge 1 or 51. Accordingly, until the depth of insertion of the data cartridge 1 or 51 from the cartridge insert opening 43 into the drive 41 reaches a given value, a small load by only the torsion spring 66 is applied to the data cartridge 1 or 51, so that the data cartridge 1 or 51 can be smoothly inserted by less insertion force. After the depth of insertion of the data cartridge 1 or 51 reaches the given value, a large load by the leaf spring 54 and the torsion spring 66 is applied to the data cartridge 1 or 51. Accordingly, an operator can easily recognize the progress of the insertion of the data cartridge 1 or 51 into the drive 41 and well carry out the insertion of the data cartridge 1 or 51. [Description of a Sliding-type, Lid Opening Mechanism]

A sliding-type, lid opening mechanism for opening the lid 24 of the data cartridge 1 or the large-capacity data cartridge 51 will now be described with reference to FIGS. 5 to 11.

Figure 10:
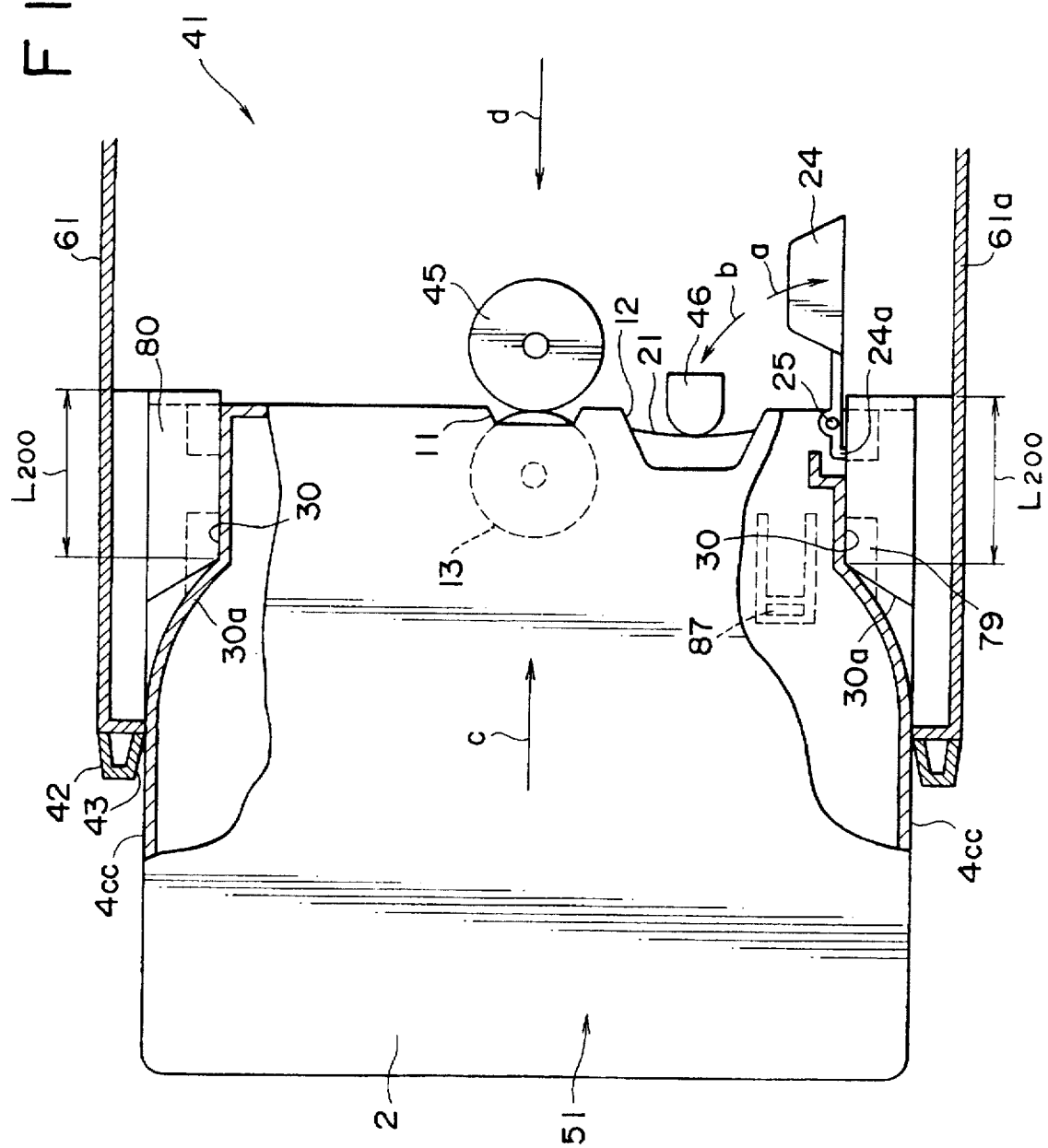
FIG. 10 is a partially sectional, top plan view illustrating a set condition of a large-capacity cartridge in the data cartridge drive.
Figure 11:
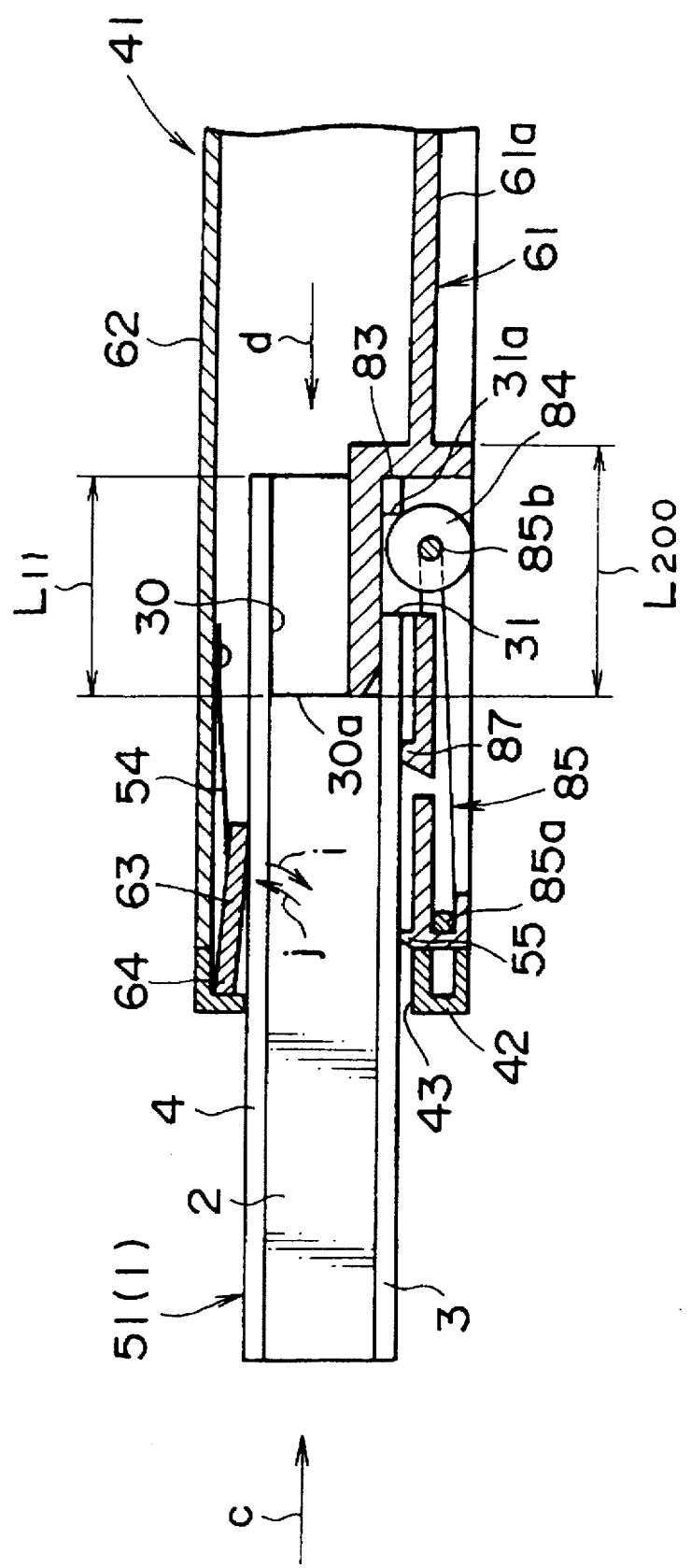
FIG. 11 is a partially sectional, side elevation of FIG. 10.
Figure 13:
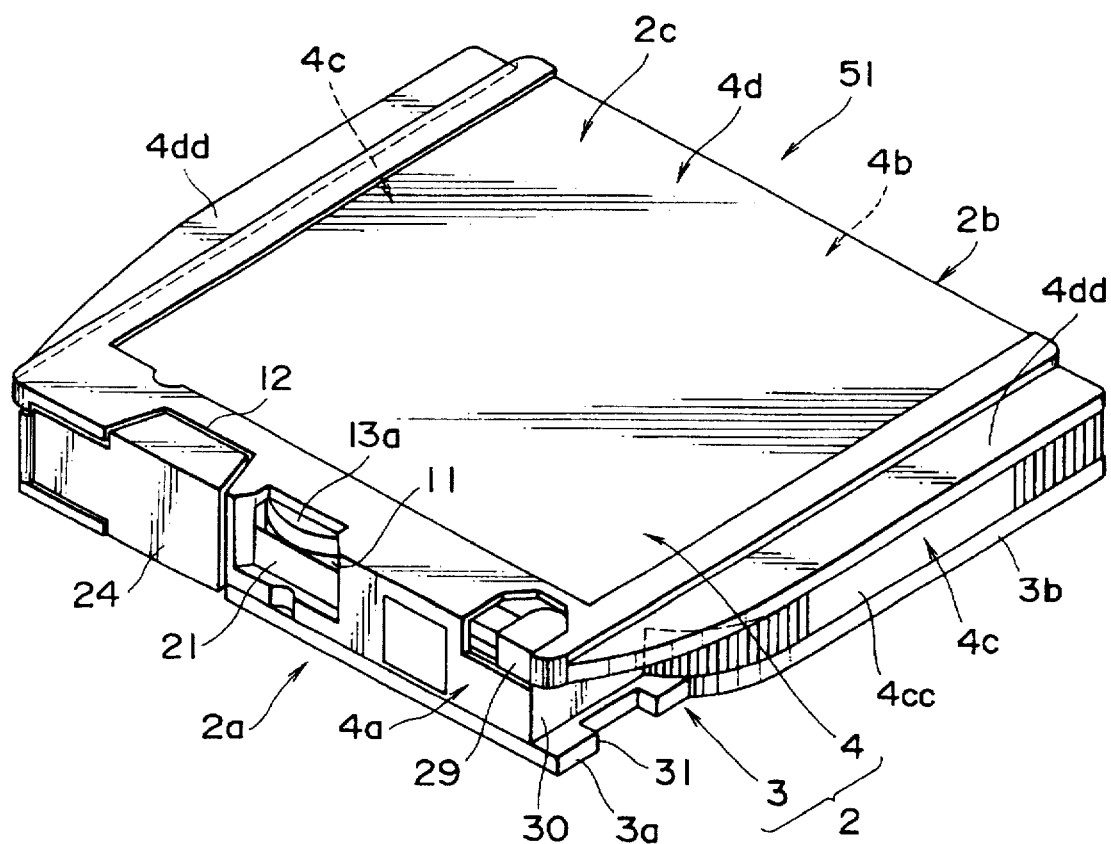
FIG. 13 is a perspective view of the large-capacity data cartridge.
Figure 14:
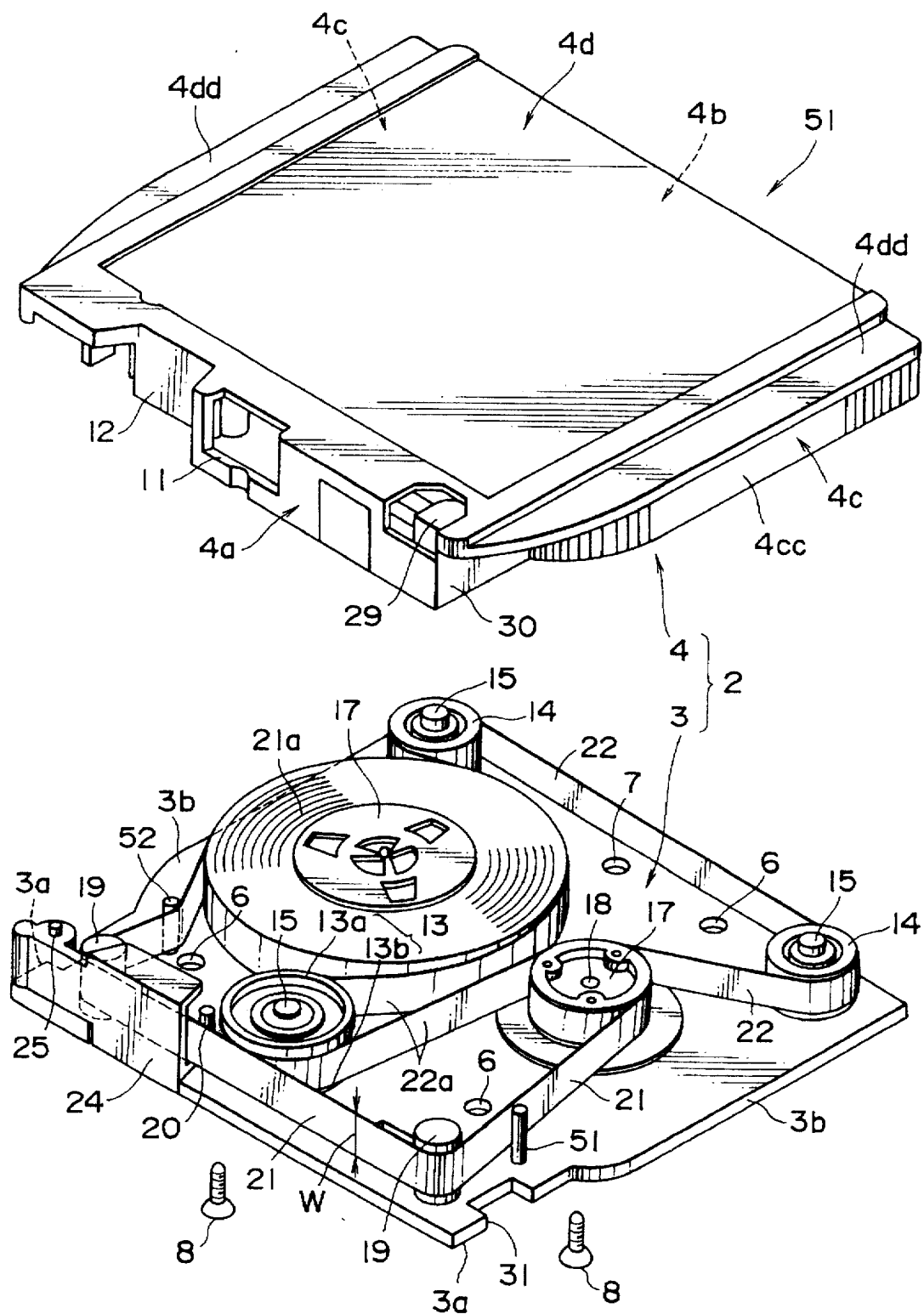
FIG. 14 is an exploded perspective view of the large-capacity data cartridge with its top cover removed.
Figure 16A:
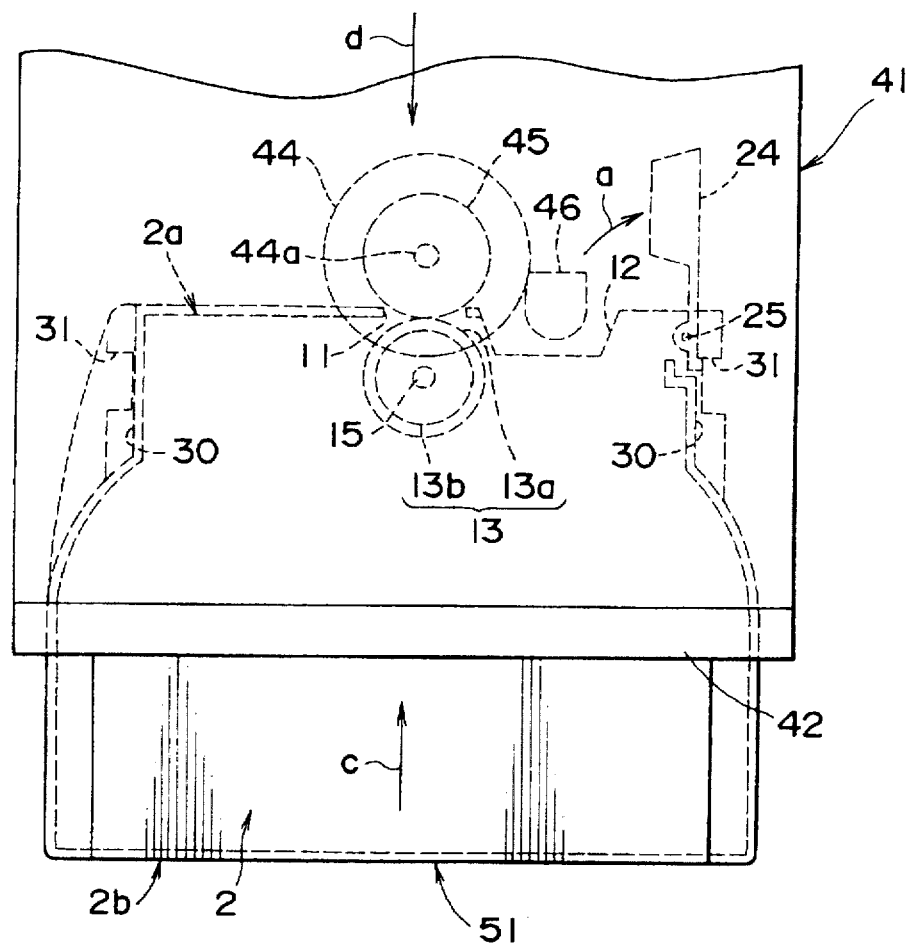
FIGS. 16A and 16B are a top plan view and a front elevation, respectively, illustrating a set condition of the large-capacity data cartridge in a data cartridge drive ready for the 3.5-inch form factor.
Figure 16B:
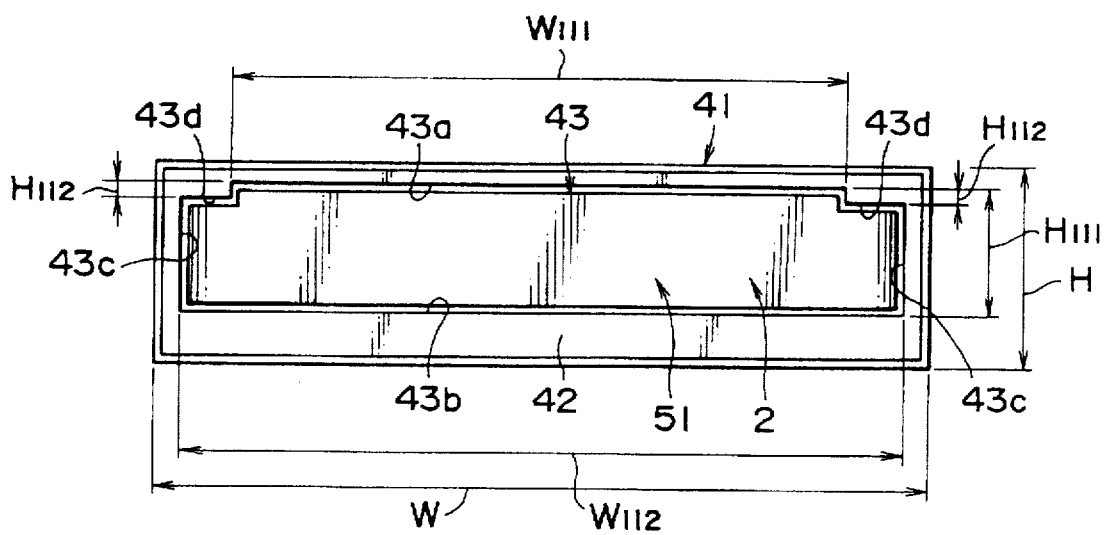
Figure 17:
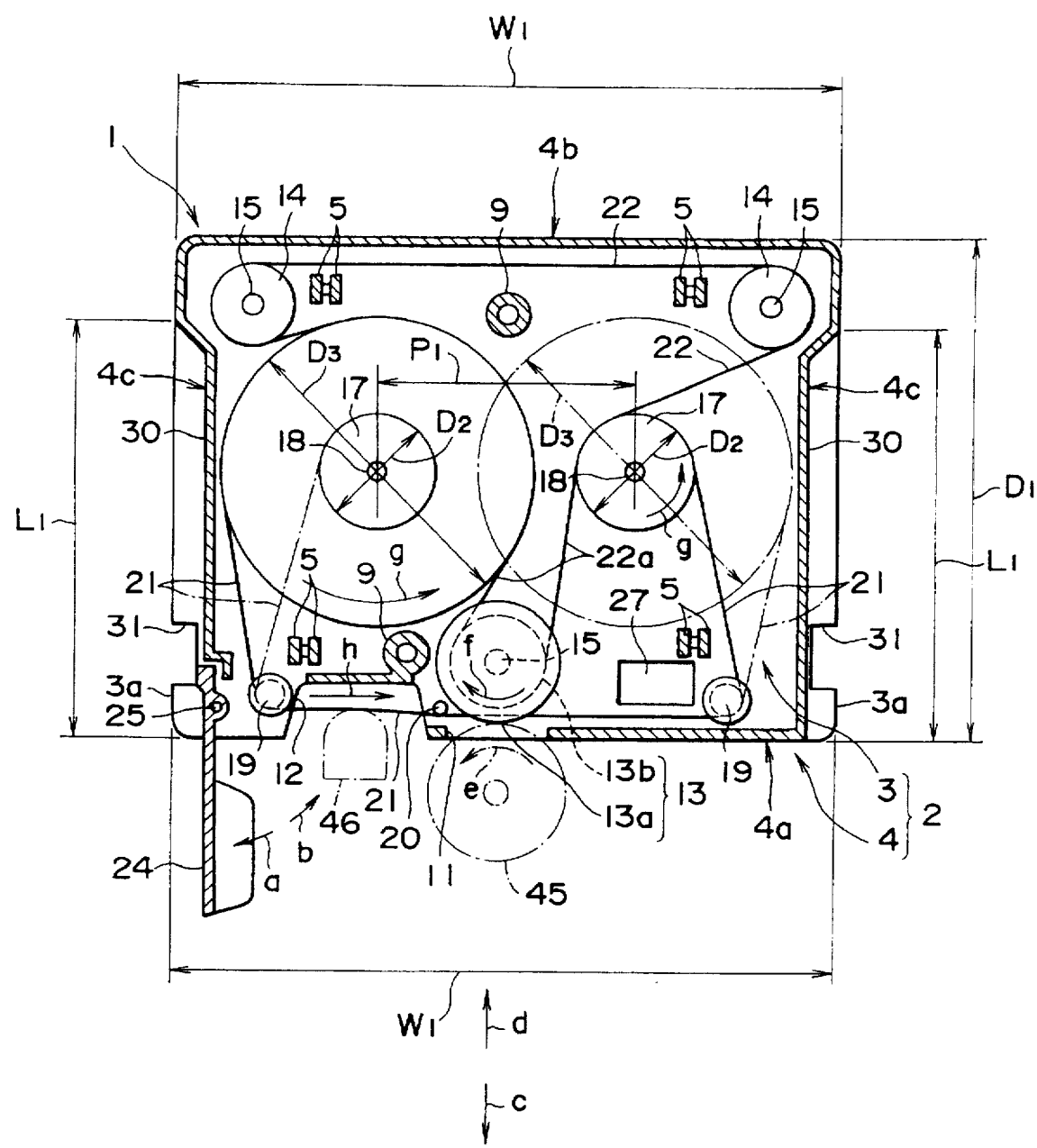
FIG. 17 is a partially sectional, top plan view of a related art data cartridge.
Figure 18:
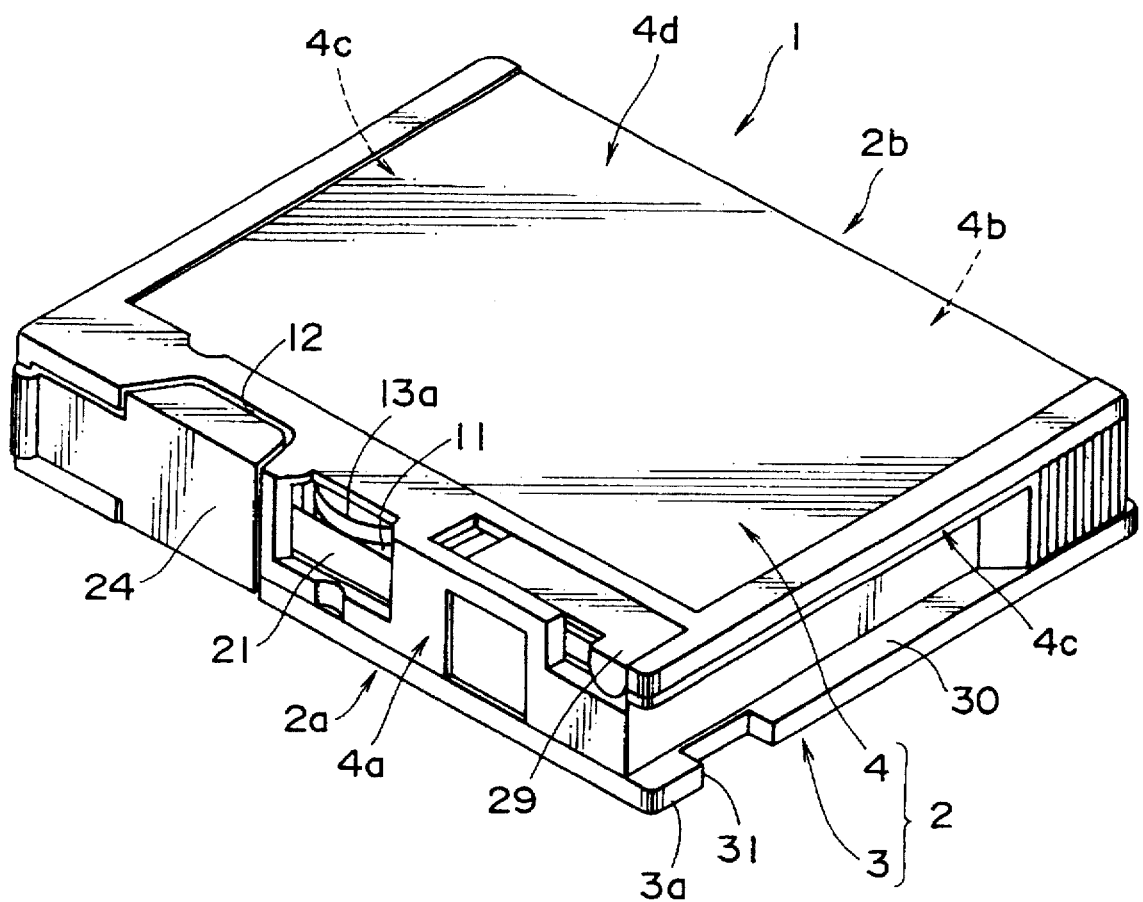
FIG. 18 is a perspective view of the related art data cartridge.
Figure 19:
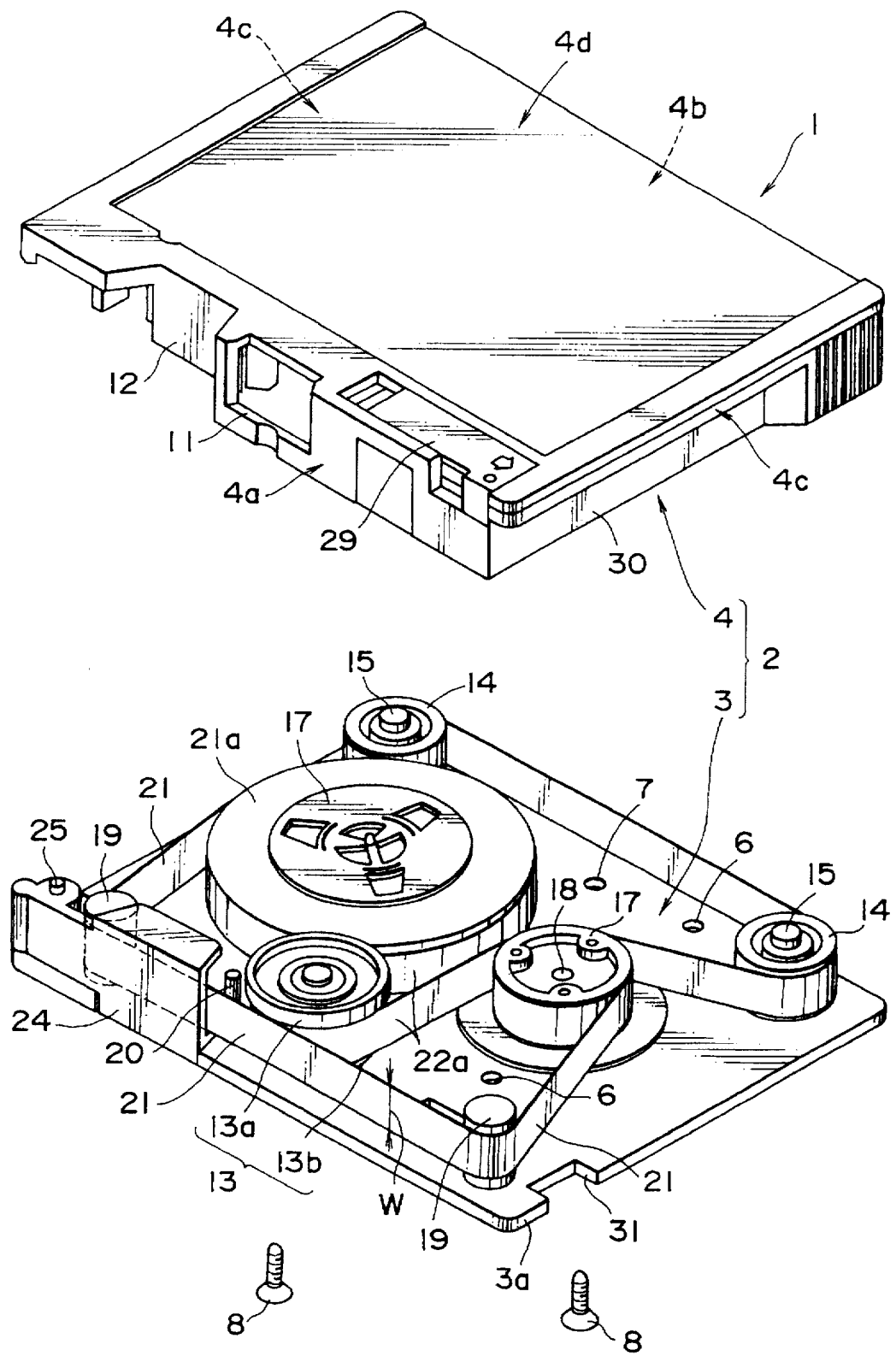
FIG. 19 is an exploded perspective view of the related art data cartridge with its top cover removed.
Figure 20:
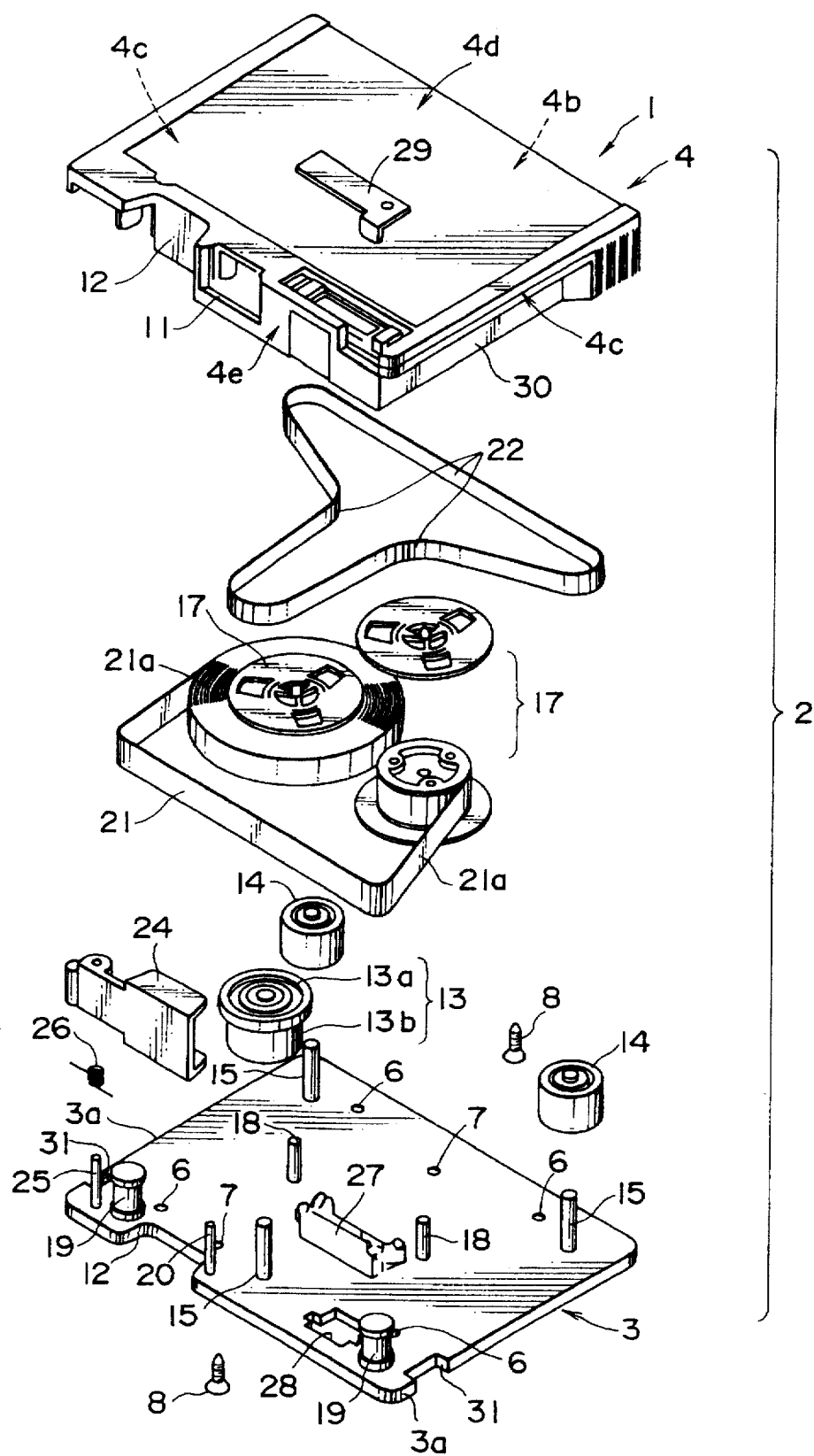
FIG. 20 is a fully exploded perspective view of the related art data cartridge.
Figure 21A:
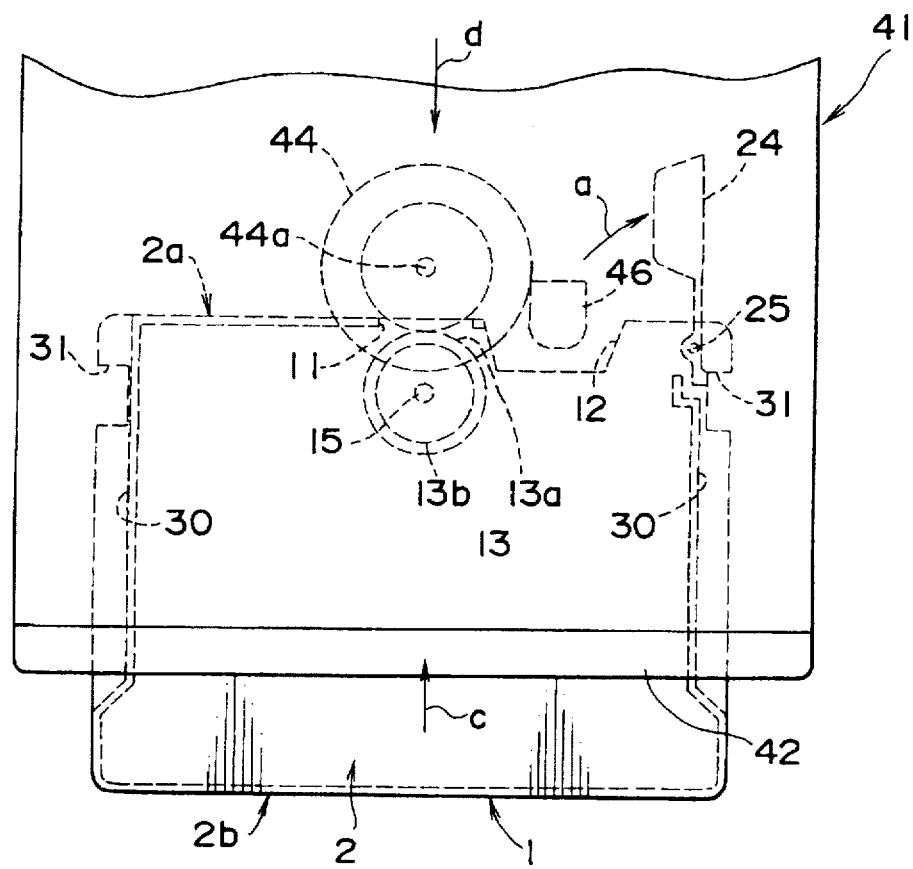
FIGS. 21A and 21B are a top plan view and a front elevation, respectively, illustrating a set condition of the related art data cartridge in a related art data cartridge drive ready for the 3.5-inch form factor.
Figure 21B:
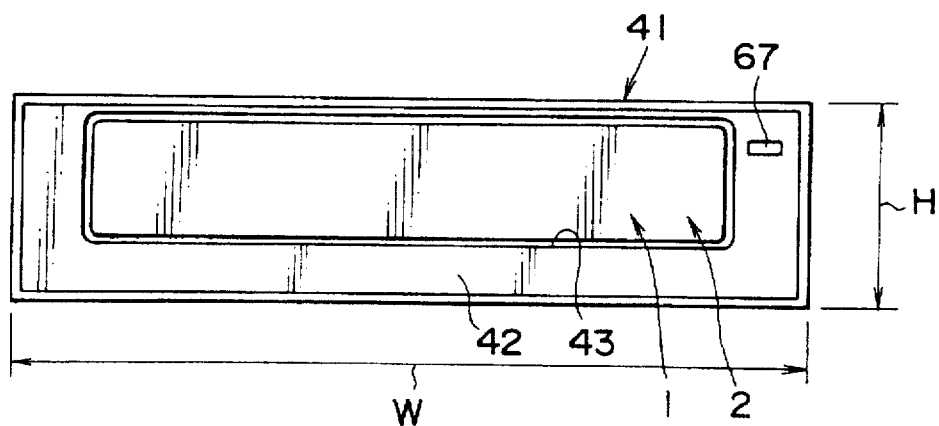
Figure 22:
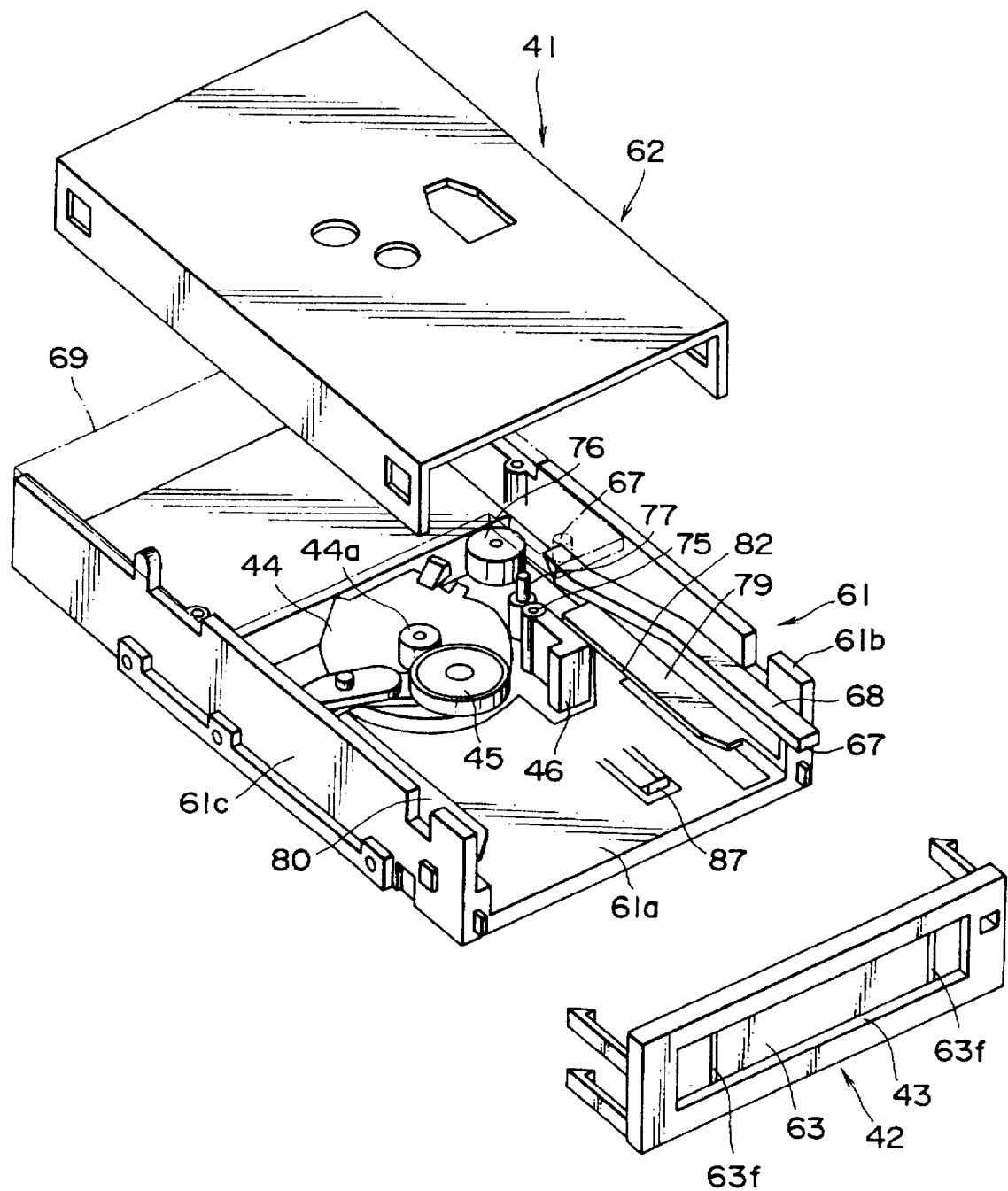
FIG. 22 is an exploded perspective view of the related art data cartridge drive shown in FIG. 21 with its top cover and its front panel removed.
Figure 24:
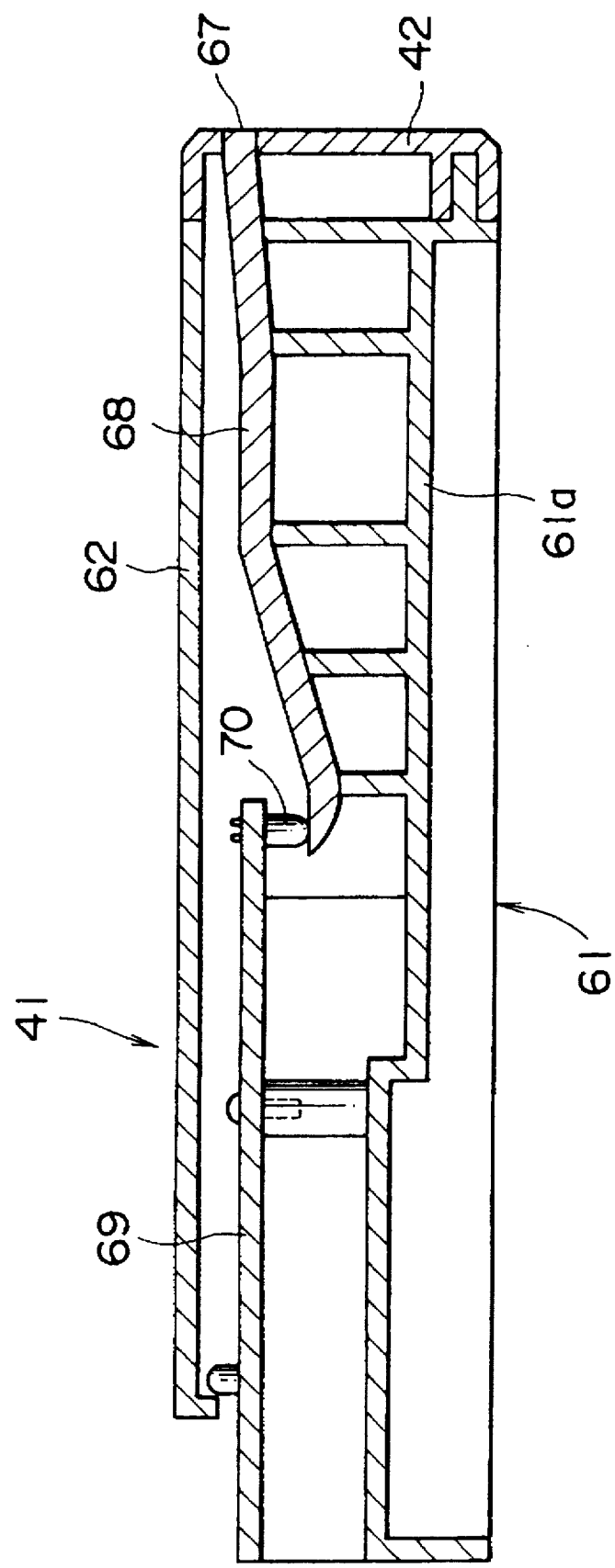
FIG. 24 is a partially sectional, side elevation of the related art data cartridge drive, illustrating the light emission indicator.
Figure 25:
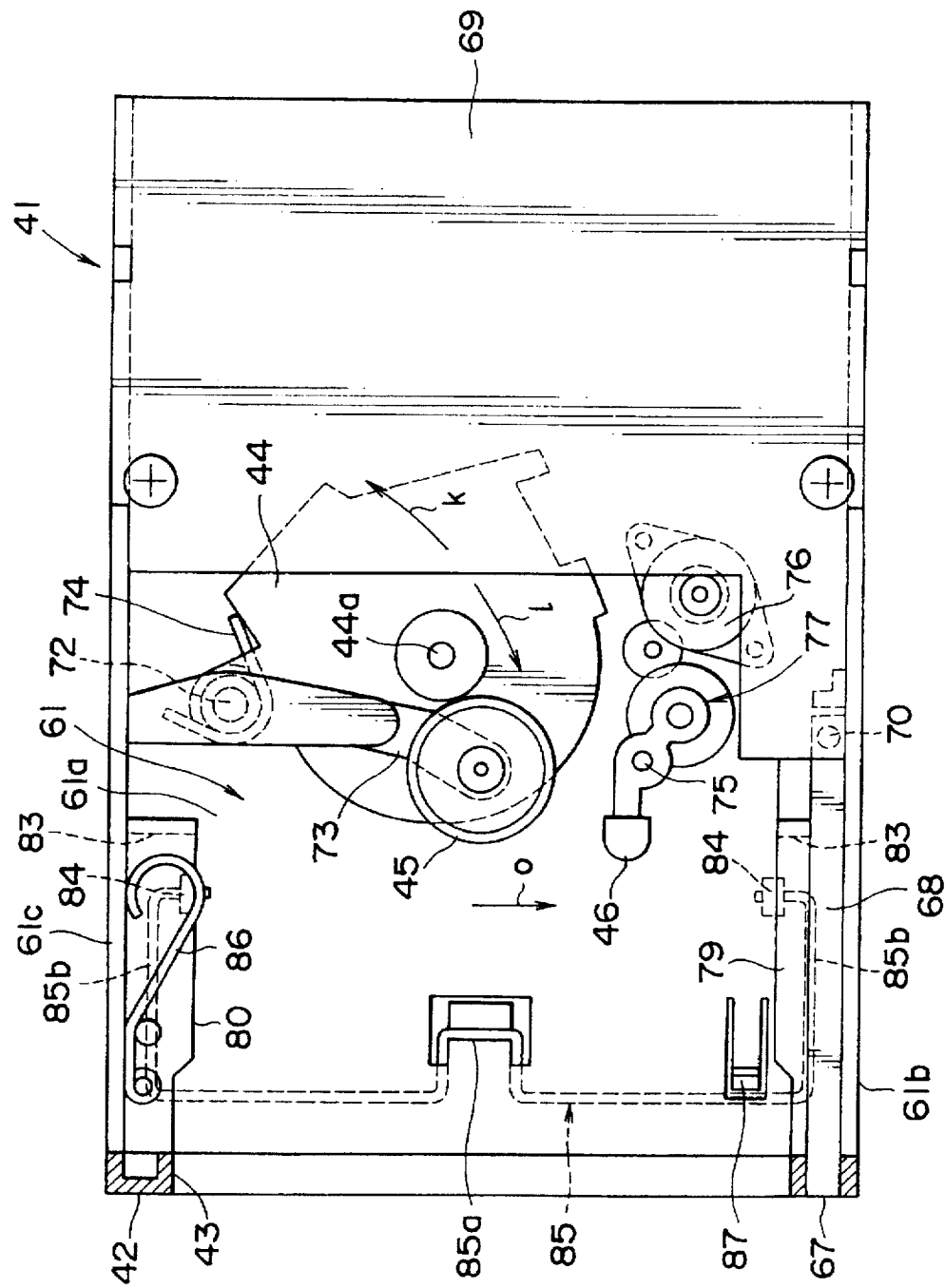
FIG. 25 is a top plan view of the related art data cartridge drive with its top cover removed.
Figure 26:
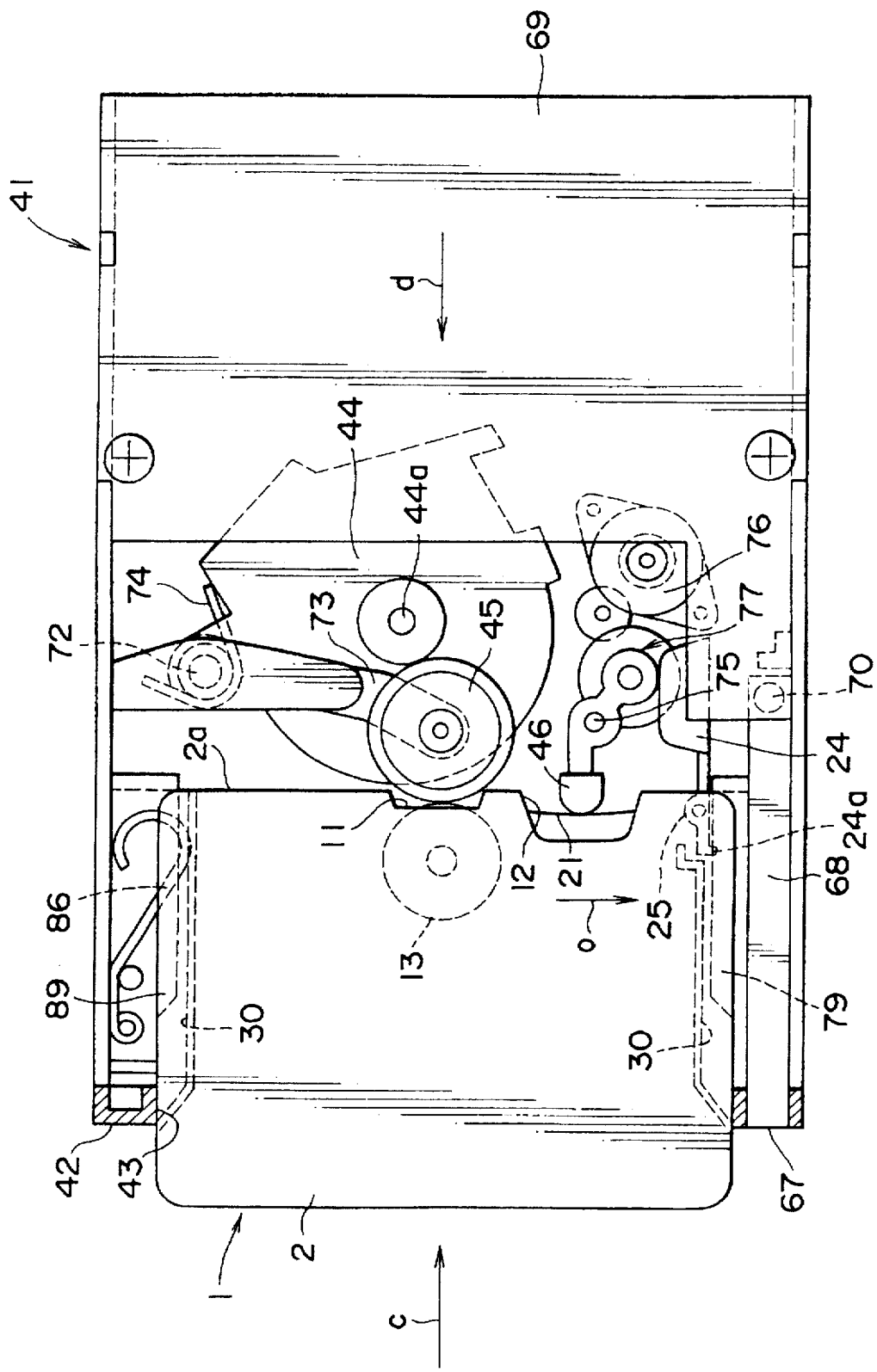
FIG. 26 is a view similar to FIG. 25, illustrating a set condition of the related art data cartridge in the related art data cartridge drive.
Figure 27:
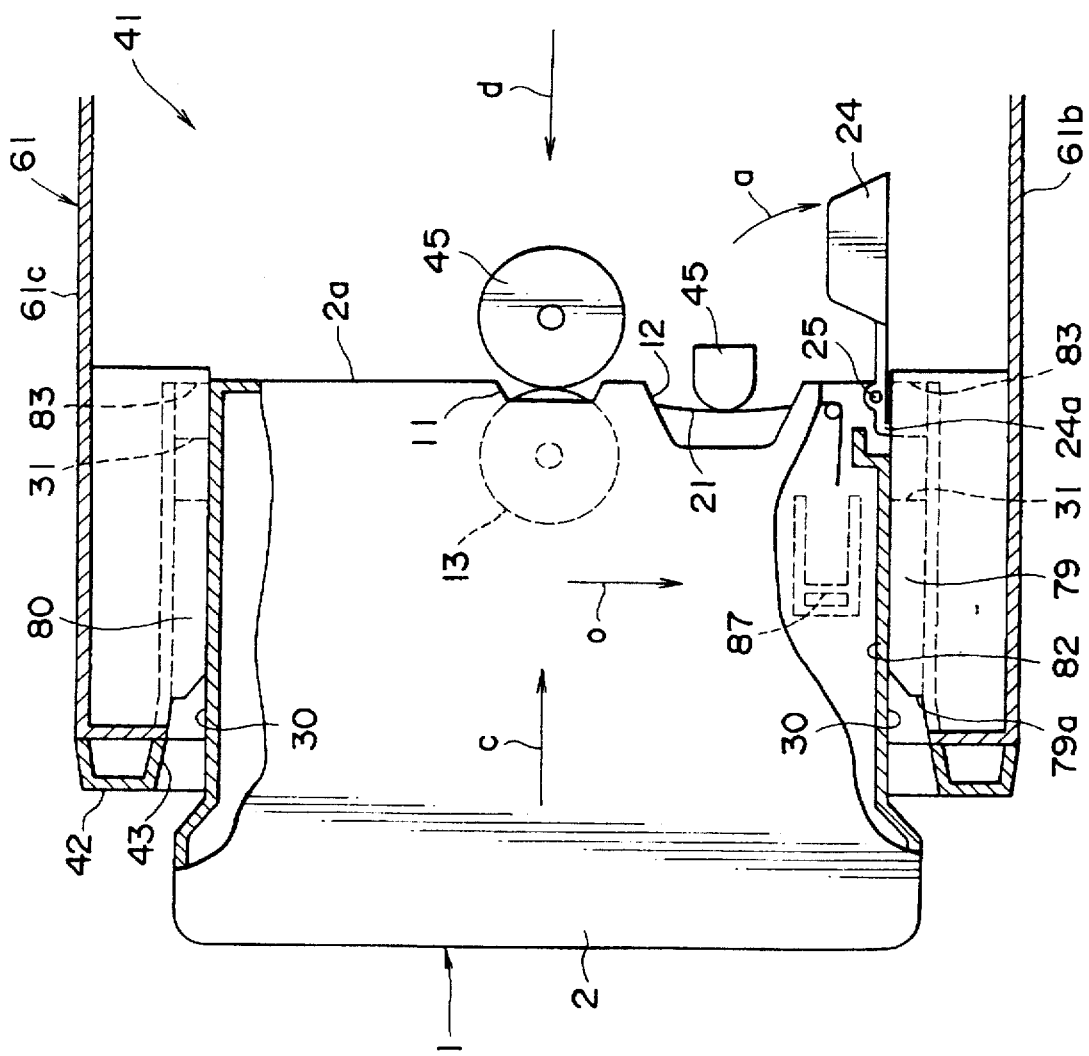
FIG. 27 is a partially sectional, enlarged top plan view of an essential part shown in FIG. 26.

As shown in FIGS. 10 and 11, the length L200 of each of right and left cartridge insert guides 79 and 80 is set short so as to conform with the length $L_{11}$ of each side groove 30 of the large-capacity data cartridge 51.

A slide guide 56 as a lid opening member is horizontally provided above the cartridge insert guide 79 in parallel thereto. The slide guide 56 is slidably mounted to one of the side walls 61b of the chassis 61 so as to be horizontally slidable along the cartridge insert guide 79 in the insert direction (shown by the arrow c) and the eject direction (shown by the arrow d) of the data cartridge 1 or the large-capacity data cartridge 51.

The slide guide 56 is integrally formed of lubricious synthetic resin such as polyacetal resin or fluorine resin. The slide guide 56 has a slide portion 56a having a substantially H-shaped cross section. The slide portion 56a of the slide guide 56 is in sliding engagement between a pair of upper and lower slide rails 57 formed integrally with one of the side walls 61b of the chassis 61 on the same side as that of the cartridge insert guide 79. An extension spring 58 as biasing means is connected between the slide guide 56 and the chassis 61 so as to normally bias the slide guide 56 in the eject direction (shown by the arrow d). A stopper 59 is formed at the front end of the slide rails 57 to normally stop the slide guide 56 biased by the extension spring 58.

The biasing force of the extension spring 58 applied to the slide guide 56 in the direction of the arrow d is set enough larger than the biasing force of the torsion spring 26 applied to the lid 24 in the direction of the arrow b.

Figure 5:
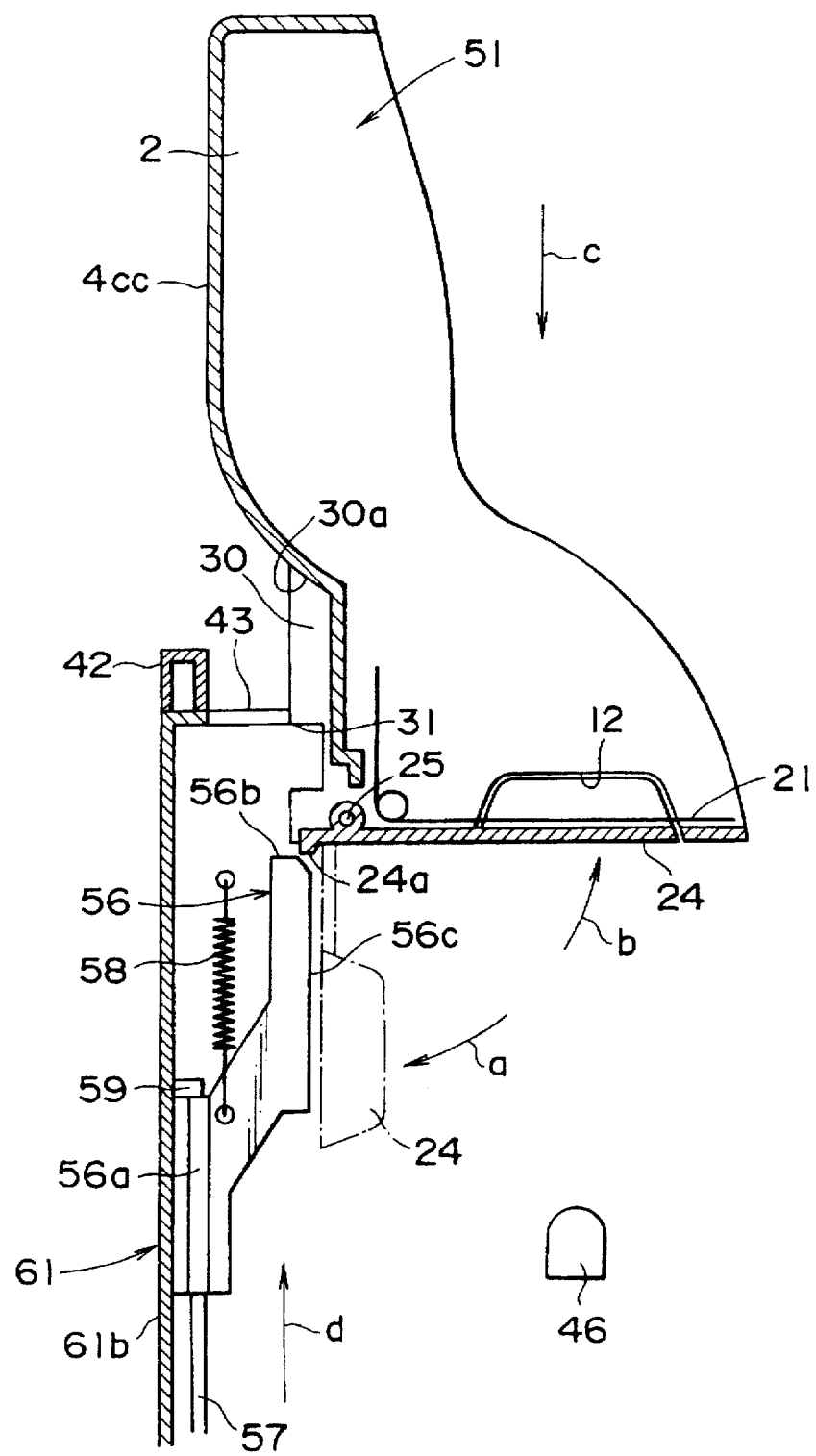
FIG. 5 is a partially sectional, top plan view illustrating the start of operation of a sliding-type, lid opening mechanism in the preferred embodiment.

The operation of the sliding-type, lid opening mechanism will now be described. In the initial stage of insertion of the large-capacity data cartridge 51 into the cartridge insert opening 43 in the direction of the arrow c as shown in FIG. 5, the counter end portion 24a of the lid 24 comes into abutment against a front end portion 56b of the slide guide 56 in the direction of the arrow c and next comes to ride on an inner side surface 56c of the slide guide 56. Accordingly, the lid 24 is pivoted about the pivot shaft 25 in the direction of the arrow a against the torsion spring 26, thus quickly opening.

At this time, the lid 24 does not interfere with the magnetic head 46 to effect safe opening operation.

Figure 6:
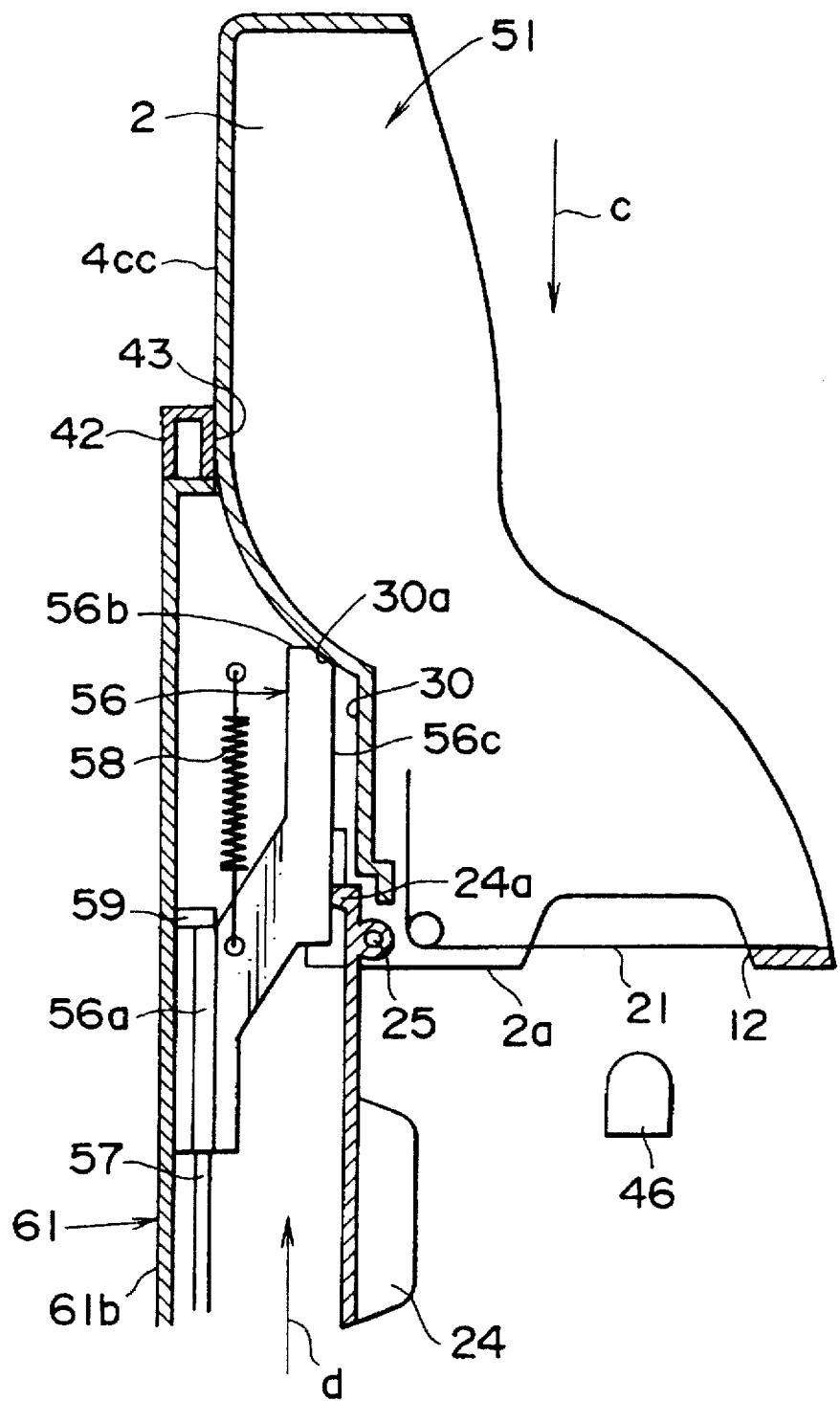
FIG. 6 is a view similar to FIG. 5, illustrating the way of operation of the sliding-type, lid opening mechanism.

When the large-capacity data cartridge 51 is further inserted in the direction of the arrow c as shown in FIG. 6, the slide guide 56 is relatively inserted into one of the side grooves 30 of the data cartridge 51 in the direction of the arrow d until the rear end 30a of this groove 30 comes into abutment against the front end portion 56b of the slide guide 56 in the direction of the arrow c.

Figure 7:
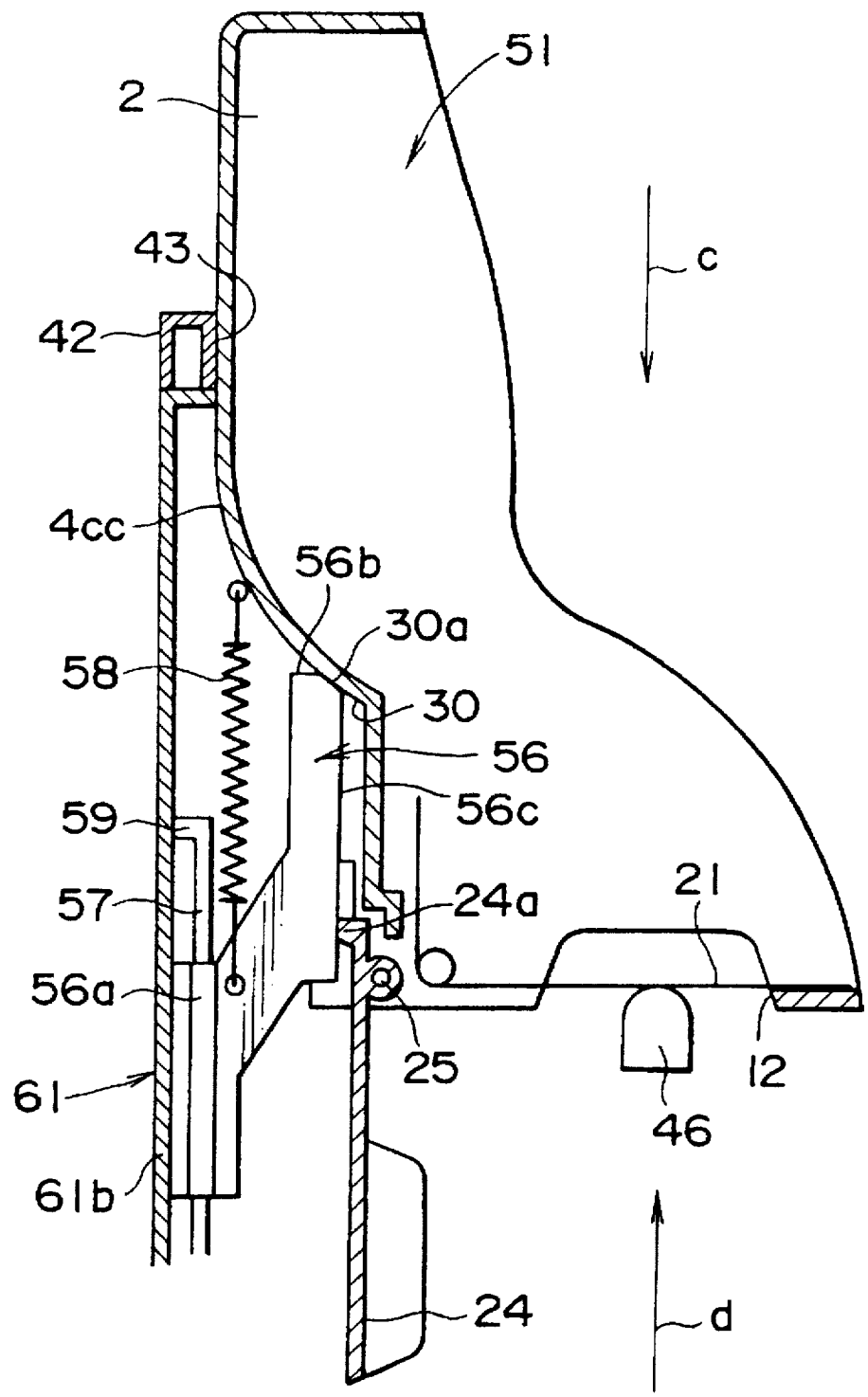
FIG. 7 is a view similar to FIG. 5, illustrating the end of operation of the sliding-type, lid opening mechanism.
Figure 8:
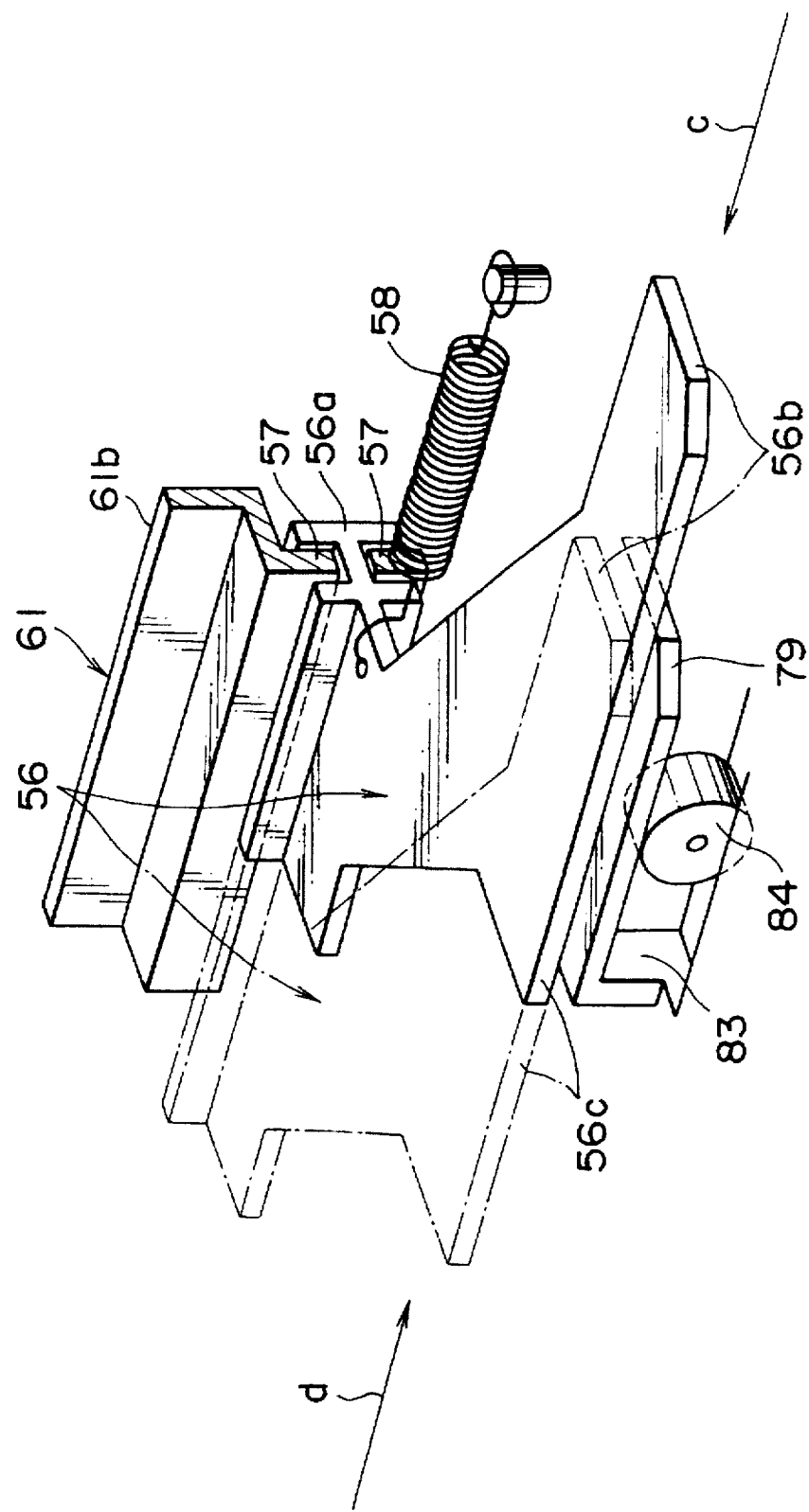
FIG. 8 is a partially sectional, perspective view of the sliding-type, lid opening mechanism.
Figure 9:
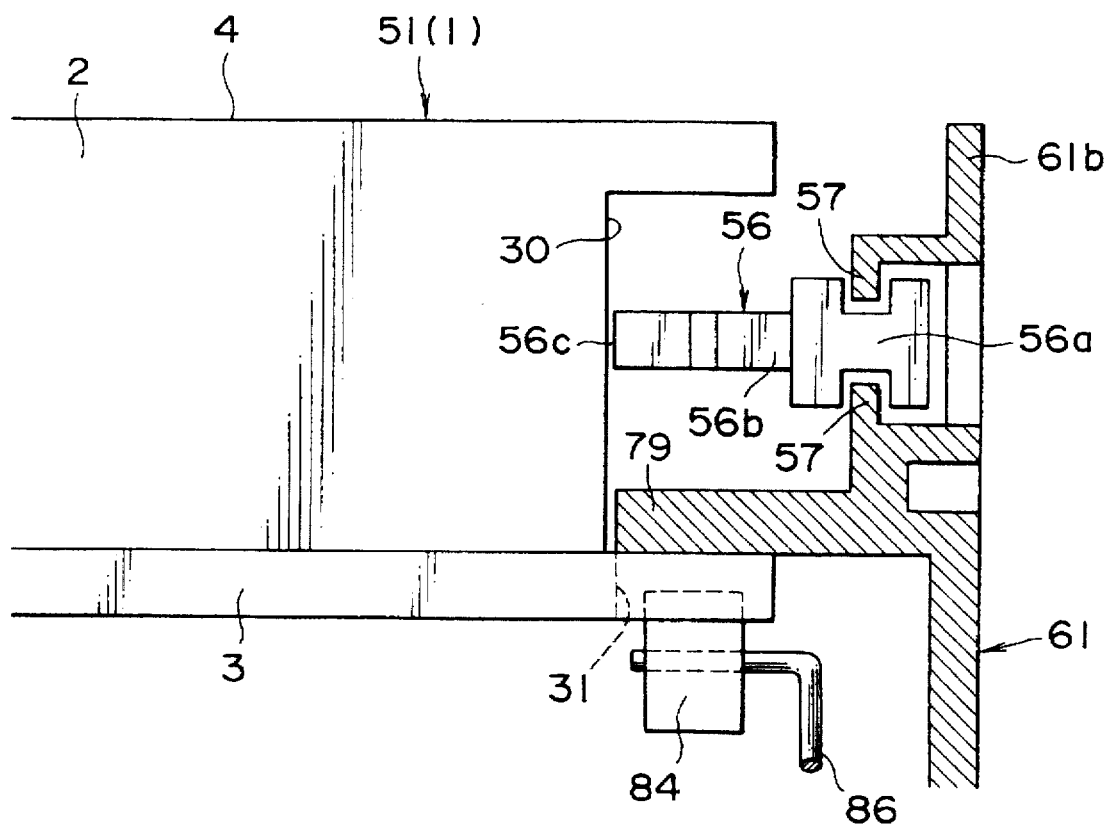
FIG. 9 is a partially sectional, front elevation of the sliding-type, lid opening mechanism.

When the large-capacity data cartridge 51 is further inserted in the direction of the arrow c as shown in FIG. 7, the slide guide 56 is pushed by the rear end 30a of this groove 30 in the direction of the arrow c and is slid along the slide rails 57 against the extension spring 58 in the direction of the arrow c.

When the insertion of the large-capacity data cartridge 51 is completed, the open lid 24 comes aside the magnetic head 46 and the magnetic head 24 is relatively inserted into the magnetic head insert recess 12 of the data cartridge 51 in the direction of the arrow d, thus coming into contact with the magnetic tape 21.

In ejecting the large-capacity data cartridge 51 from the cartridge insert opening 43 in the direction of the arrow d, the slide guide 56 is pulled by the extension spring 58 to slide in the direction of the arrow d until coming into abutment against the stopper 59.

In inserting the data cartridge 1 into the cartridge insert opening 43, the counter end portion 24a of the lid 24 is relatively pushed by the front end portion 56b of the slide guide 56 in the direction of the arrow d in the condition where the slide guide 56 is kept in abutment against the stopper 59 by the tensile force of the extension spring 58, thereby quickly opening the lid 24 in the direction of the arrow a.

With this configuration, the lid 24 of the large-capacity data cartridge 51 or the data cartridge 1 can be smoothly opened by the slide guide 56 irrespective of the length L200 of each of the cartridge insert guides 79 and 80. Furthermore, no interference between the lid 24 and the magnetic head 46 occurs to always effect safe opening of the lid 24.

Further, since the slide guide 56 is formed of lubricious synthetic resin such as polyacetal resin or fluorine resin, smooth sliding of the slide guide 56 along the slide rails 57 in the direction of the arrows c and d can be effected. Accordingly, load during insertion of the data cartridge 51 or 1 can be reduced to effect smooth insertion of the data cartridge 51 or 1. In addition, no lubricating oil such as grease is needed, thereby improving the productivity.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A data cartridge drive for use with a data cartridge having a front portion, a rear portion having a width greater than a width of said front portion, a front end formed with a magnetic head insert recess, a lid pivotally mounted to said front end for openably closing said magnetic head insert recess, and a pair of grooves formed on a pair of side walls of the front portion, said data cartridge drive comprising:

a housing;

a front panel mounted on a front end of said housing and having a cartridge insert opening through which said data cartridge is inserted into said housing;

a lid opening member located in said housing at a position near said front panel on one lateral side of said cartridge insert opening said lid opening member being adapted to relatively come into abutment against a counter end portion of said lid of data cartridge inserted through said cartridge insert opening into said housing to pivotally open said lid and being slidably engaged into one of said pair of grooves of said data cartridge; said lid opening member being slidable in an insert direction of said data cartridge in cooperation with insertion of said data cartridge after said lid opening member is engaged into said one of said pair of grooves;

a first biasing means for biasing said lid opening member in an eject direction opposite to said insert direction.

2. A data cartridge drive according to claim 1, wherein said data cartridge has a second biasing means for biasing said lid in a closing direction of said lid, and a biasing force of said first biasing means for biasing said lid opening member in said eject direction of said data cartridge is set larger than a biasing force of said second biasing means for biasing said lid in said closing direction.

3. A data cartridge drive according to claim 1, wherein said lid opening member is formed of lubricious synthetic resin.

4. A data cartridge drive according to claim 2, wherein said lid opening member is formed of lubricious synthetic resin.

5. A data cartridge drive according to claim 1, wherein said housing has a pair of slide rails between which said lid opening member is slidably engaged, and a stopper is formed at front ends of said slide rails to stop said lid opening member against the biasing force of said first biasing means.

* * * * *